US007890362B2

(12) United States Patent
Flores

(10) Patent No.: US 7,890,362 B2
(45) Date of Patent: Feb. 15, 2011

(54) MISCLASSIFICATION MINIMIZATION AND APPLICATIONS

(75) Inventor: Laurent Flores, Secaucus, NJ (US)

(73) Assignee: SoftNovation, LLC, Secaucus, NJ (US)

( * ) Notice: Subject to any disclaimer, the term of this patent is extended or adjusted under 35 U.S.C. 154(b) by 1053 days.

(21) Appl. No.: 11/699,040

(22) Filed: Jan. 29, 2007

(65) Prior Publication Data

US 2007/0203782 A1    Aug. 30, 2007

Related U.S. Application Data

(60) Provisional application No. 60/762,494, filed on Jan. 27, 2006.

(51) Int. Cl.
*G06F 9/44* (2006.01)
*G06F 17/50* (2006.01)

(52) U.S. Cl. .......................................................... 705/7

(58) Field of Classification Search ........................ None
See application file for complete search history.

(56) References Cited

U.S. PATENT DOCUMENTS

| 2002/0147628 | A1* | 10/2002 | Specter et al. | ................ | 705/10 |
| 2003/0088365 | A1* | 5/2003 | Becker | ......................... | 702/19 |
| 2007/0067273 | A1* | 3/2007 | Willcock | ....................... | 707/4 |
| 2008/0065471 | A1* | 3/2008 | Reynolds et al. | .............. | 705/10 |

OTHER PUBLICATIONS

Boulding et al., "A Dynamic Process Model of Service Quality: From Expectations to Behavioral Intentions," Journal of Marketing Research, Feb. 1993, pp. 7-27, vol. 30.

Dahan et al., "The Virtual Customer," (Sep. 2001), pp. 1-25, Ref. pp. 1-6, Figs. pp. 1-18.

Dahan et al., "Product Development—Managing a Dispersed Process," Handbook of Marketing, Center for Innovation in Product Development at M.I.T., Nov. 2001, pp. 1-64, R1-R15.

Dennis et al., "Computer Brainstorms: More Heads Are Better Than One," Journal of Applied Psychology, 1993, pp. 531-537, vol. 78, No. 4.

(Continued)

*Primary Examiner*—Romain Jeanty
*Assistant Examiner*—Brandi P Parker
(74) *Attorney, Agent, or Firm*—Larry S. Millstein; Millen, White, Zelano & Branigan, P.C.

(57) ABSTRACT

The invention provides improved methods for selecting items most likely to be the best items in a population of items. In accordance with certain preferred embodiments the probability that an item is among the best items in the population is determined by calculating the misclassification probability of each item and designating as the best items those with a misclassification index above a first threshold value from among the values thus determined and as the not best items those with a misclassification index below a second threshold value from among the values thus determined. In further preferred methods of the invention, the misclassification probabilities are determined by rankings of the items by respondents. In certain preferred embodiments the selection methodology of the invention is used to involve consumers in the screening stage of the idea generation process. The methodology is faster and more accurate in selecting the best items in a population than other methods.

17 Claims, 9 Drawing Sheets

Misclassification Minimization
Comparison with Confidence Maximization
100 ideas, 1– 200 respondents

OTHER PUBLICATIONS

Gallupe et al., "Unblocking Brainstorms," Journal of Applied Psychology, 1991, pp. 137-142, vol. 76, No. 1.

Gallupe et al., "Electronic Brainstorming and Group Size," The Academy of Management Journal, Jun. 1992, pp. 350-369, vol. 35, No. 2.

Goldenberg et al., "Towrd Identifying the Inventive Templates of New Products: A Channeled Ideation Approach," Journal of Marketing Research, May 1999, pp. 200-210, vol. 36.

Goldenberg et al., "The Fundamental Templates of Quality Ads," Marketing Science, 1999, pp. 333-351, vol. 18, No. 3.

Hauser et al., "Research on Innovation: A Review and Agenda for Marketing Science," Mar. 25, 2005, pp. 1-48, Ref. pp. 1-14.

Hauser et al., "The Impact of Utility Balance and Endogeneity in Conjoint Analysis," Marketing Science, Summer 2005, pp. 498-507, vol. 24, No. 3.

Nunmaker et al., "Facilitating Group Creativity: Experience . . . Support System," Journal of Marketing Information Systems, Spring 1987, pp. 1-19, vol. 3, No. 4.

Rust et al., "Reliability Measures for Qualitative Data: Theory and Implications," Journal of Marketing Research, Feb. 1994, pp. 1-14, vol. 31.

Valacich et al., "Idea Generation in Computer-Based Groups: A New Ending to an Old Story," Organizational Behavior and Human Decision Processes 57, 1994, pp. 448-467.

von Hippel, "Stickey Information" and the Locus of Problem Solving: Implications for Innovation, Management Science, Apr. 1994, pp. 429-438, vol. 40, No. 4.

von Hippel, "Economics of Product Development by Users: The Impact of "Sticky" Local Information," Management Science, May 1998, pp. 629-644, vol. 44, No. 5.

* cited by examiner

Misclassification Minimization
Type I Errors

Misclassification Minimization
Type II Errors

Misclassification Minimization
Misspecification of a Beta(1,3) Prior as a Uniform Prior
*Top 10 Items*

Fit to the *Beta* Distribution

MISCLASSIFICATION MINIMIZATION AND APPLICATIONS

REFERENCE TO RELATED APPLICATIONS

This application is a continuation-in-part of U.S. Application Ser. No. 60/762,494 filed 27 Jan. 2006, which application is incorporated herein by reference in its entirety and of which full benefit of priority is claimed for the present application.

FIELD OF THE INVENTION

The invention relates to processes for determining among a population of items the items with the highest probabilities of being the "best" items in the population, based on evaluations by a panel of one or more respondents, such as opinion surveys. In a particular aspect, the invention relates to methods for surveying consumer respondents about items as for new product development that efficiently determine the items most likely to have the highest evaluations in a population as a whole, based on those of a limited number of respondents. In a highly preferred particular aspect, the processes select the items to be evaluated by successive respondents based on a statistical measure of each item's evaluation history. A preferred measure is the misclassification probability, which is calculated from the mean, SEM, and total number of previous evaluations using a known or assumed prior for the probability distribution of the values among the items in the populations. The use of "real time" probability estimates in selecting items and the use of a prior tailored to the given population both provide improved results compared to other methods. The invention further provides software, systems, and the like relating thereto.

BACKGROUND OF THE INVENTION

Surveys provide information that is important, and often critical, to decision making across a broad spectrum of endeavors. Among the most important and familiar of these is the U.S. Census, which strives to collect categorical information on every family in the United States and its territories. Although the goal of the census is to collect the information directly from the entire population, it has not been possible to do so. Rather, it is well established that the population of direct respondents does not include substantial and important portions of the population. And, it has become clear that the demography of the non-responding population is substantially different from that of the direct respondents. As a result, direct respondent census data contains important inaccuracies. The inaccuracies can be ameliorated to some extent by additional efforts to obtain the omitted information directly from the non-responding population. Such efforts, however, generally have been insufficiently successful to ensure that the census data represents the nation's population with sufficient accuracy for fairness in electoral redistricting and population-dependent allocation of federal resources. The census, accordingly, has applied statistical sampling methods to characterize, quantify, and statistically adjust the available data so that it more accurately portrays the true population.

Unlike the census, other polls and surveys do not seek responses from all members of an objective population. Rather, they seek to obtain a representative sample of the population, one that is as small as possible for a given degree of uncertainty when the sample data is applied to the population as a whole. Familiar methods that rely on statistical sampling of populations include, in the political area, for instance, both pre-election polling and exit polling of voters after they have cast their votes. Similar methods are crucial to market research surveys, which aim to characterize the response of a target "consumer" population to various products or services, and to specific aspects and designs thereof, among other things, from initiation of product development plans to decisions to discontinue a product.

For instance, product development cycles start with ideas, and idea generation is a critical first step in new product development. It belongs to the "fuzzy front end" of the development process, that has been recognized as a key leverage point. Dahan and Hauser (2001a) and Hauser et al. (2005). Many idea generation methods have been developed beginning in the 1950s. Brainstorming is probably the most popular method. Osborn (1957). Other idea generation methods include lateral thinking (De Bono (1970)), synectics (Prince (1970)), and six thinking hats (De Bono (1985)). More recently developed methods include electronic brainstorming, as described by Nunamaker et al. (1987), Gallupe et al. (1991), Gallupe et al. (1992), Dennis and Valacich (1993), and Valacich et al. (1994), ideation templates, as described by Goldenberg et al. (1999a), Goldenberg et al. (1999b), Goldenberg and Mazursky (2002), and incentives-based idea generation.

Successful idea generation processes typically produce a great many ideas. Often there are too many ideas to pursue them all. As a result, the ideas must be evaluated to select those on which to focus available resources. Several methods have been developed to systematize this process. One traditional approach is to ask experts to evaluate the ideas. Urban and Hauser (1993). However, experts are often costly, and their opinions often do not accurately reflect the needs and preferences of product users. Other methods suffer from similar disadvantages.

There is, therefore, a need to identify in a large group of ideas and other items those which merit further development effort. This is particularly so for ideas and other items generated by systematic idea generative processes. And while such methods are needed in many other areas, they are particularly needed for evaluating ideas and other items for developing consumer products.

SUMMARY OF THE INVENTION

It is therefore among the various objects of the present invention to provide methods, systems, computer programs, algorithms, hardware, software, and the like for selecting items from a group of items according to misclassification probability, as herein illustratively disclosed and exemplified.

The following numbered paragraphs summarize various aspects and preferred embodiments of the invention. The description provided therein is illustrative and not limitative. The numbered paragraphs are self referential and combinatorial, and serve efficiently to set forth explicitly the many ways in which various aspects and embodiments of the invention can be used together with one another. It is explicitly the inventor's purpose in this regard to provide support for claims to each of these ways of combining aspects of the invention, severally, in any combination, as well as individually. Applicant reserves the right to amend the specification to set forth individually any of the aspects and embodiments of the invention described by the following paragraphs in any combination with one another.

1. A computer implemented method for selecting a sub-population of items with the highest probabilities of meeting a criterion based on evaluations of items by respondents, comprising:

(A) providing in computer readable form a population of I items i,
(B) presenting to each of a plurality of respondents one or more items, i, of said population for evaluation,
(C) receiving from said plurality of respondents said evaluations,
(D) based on said evaluations selecting a sub-population of items with the highest probability of meeting a criterion S,
wherein said sub-population meeting said criterion is identified by:
  (i) for each respondent, for each i in I, calculating an estimated probability of meeting criterion S based on the evaluations of previous respondents;
  (ii) establishing a threshold estimated probability to divide the items in I into a group of m items with the highest estimated probabilities of meeting the criterion and a group of I−m items with the lowest probabilities of meeting said criterion;
  (iii) determining the lowest probability estimate, $\underline{p}$, among the m items with probabilities above the threshold, and the highest probability estimate, $\overline{p}$, among the items with probabilities below the threshold;
  (iv) computing a misclassification probability, $t_i$, wherein for items above the threshold $t_i=\text{Prob}(p_i \leq \overline{p})$, and for items below the threshold $t_i=\text{Prob}(p_i \geq \underline{p})$; and
  (v) selecting the k items with the highest misclassification probabilities for evaluation by the next respondent; and
  (vi) repeating steps (i) through (v) until said sub-population is identified, and
(E) recording said sub-population or the identity thereof in a tangible medium for further computer processing or for human readable display.

2. A computer implemented method for selecting from a population of I items one or more items, i, most likely to meet a criterion S based on evaluations by respondents, comprising:
(A) providing in computer readable form a population of I items i,
(B) presenting to each of a plurality of respondents one or more items, i, of said population for evaluation,
(C) receiving from said plurality of respondents said evaluations,
(D) based on said evaluations selecting a sub-population of items with the highest probability of meeting a criterion S,
wherein said sub-population meeting said criterion is identified by
  (i) calculating for each item in I a probability p of meeting criterion S based on evaluations by previous respondents in accordance with equation I: $p_i = f\{(n_{Si})_{i \in \{1, \ldots, I\}} / [(n_{Si})_{i \in \{1, \ldots, I\}} + (n_{Fi})_{i \in \{1, \ldots, I\}}]\}$ wherein $(n_{Si})_{i \in \{1, \ldots, I\}}$ is the number of previous respondent evaluations of i as meeting S; and $(n_{Fi})_{i \in \{1, \ldots, I\}}$ is the number of previous respondent evaluations of i as failing to meet S;
  (ii) selecting m items having $p_i$ above or below a threshold p of meeting S;
  (iii) determining the lowest $p_i$ ($\underline{p}$) among the m items with the highest $p_i$ and the highest $p_i$ among the I−m other items;
  (iv) calculating a misclassification probability, $t_i$, wherein
    $t_i=\text{Prob}(p_i \leq \overline{p})$ for each i of m, and
    $t_i=\text{Prob}(p_i \geq \underline{p})$ for each i of I not in m; and
  (v) selecting k items for evaluation by the n+1 respondent with the highest misclassification probabilities;
  (vi) repeating the procedure for subsequent respondents; and
  (vii) following evaluation by a final respondent, selecting the m items with the lowest misclassification probabilities as those most likely to meet S, and
(E) recording said m items or the identity thereof in a tangible medium for further computer processing or for human readable display.

3. A method for selecting from a population of I items, a sub-population of items with the highest probabilities of meeting a criterion S based on evaluations of items (from the population) by respondents, wherein the method comprises the use of an algorithm in accordance with the following:
(A) for each respondent, calculate for each i in I an estimated probability of meeting criterion S based on the evaluations of previous respondents;
(B) establish a threshold estimated probability to divide the items in I into a group of m items with the highest estimated probabilities and a group of I−m items with the lowest probabilities;
(C) determine the lowest probability estimate, $\underline{p}$, among the m items with probabilities above the threshold, and the highest probability estimate, $\overline{p}$, among the items with probabilities below the threshold;
(D) compute a misclassification probability, $t_i$, wherein for items above the threshold $t_i=\text{Prob}(p_i \leq \overline{p})$, and for items below the threshold $t_i=\text{Prob}(p_i \geq \underline{p})$;
(E) select the k items with the highest misclassification probabilities for evaluation by the next respondent; and repeat steps A through E for subsequent respondents.

4. A method according to any of the foregoing or the following, wherein evaluations are obtained until one or more criteria are met, wherein the criteria can be any one or any two or more in any combination of the following: number of respondents; number of one or more particular type(s) of respondent; number of evaluations; number of one or more particular types of evaluations; a minimum degree of statistical confidence; an increment in statistical confidence for additional respondents and/or evaluations below a specific threshold; and the like.

5. A method according to any of the foregoing or the following for selecting from a population of I items one or more items, i, most likely to meet a criterion S based on evaluations by respondents, comprising:
(A) for a respondent n+1 selecting for evaluation k of the I items by calculating for each item in I a probability p of meeting criterion S based on evaluations by previous respondents in accordance with equation I, as follows:

$$p_i = f\{(n_{Si})_{i \in \{1, \ldots, I\}} / [(n_{Si})_{i \in \{1, \ldots, I\}} + (n_{Fi})_{i \in \{1, \ldots, I\}}]\}$$

wherein $(n_{Si})_{i \in \{1, \ldots, I\}}$ is the number of previous respondent evaluations of i as meeting S; and $(n_{Fi})_{i \in \{1, \ldots, I\}}$ is the number of previous respondent evaluations of i as failing to meet S;
selecting m items having $p_i$ above or below a threshold p of meeting S;
determining the lowest $p_i$ ($\underline{p}$) among the m items with the highest $p_i$ and the highest $p_i$ among the I−m other items;
calculating a misclassification probability, $t_i$, wherein
  $t_i=\text{Prob}(p_i \leq \overline{p})$ for each i of m, and
  $t_i=\text{Prob}(p_i \geq \underline{p})$ for each i of I not in m; and
selecting k items for evaluation by the n+1 respondent with the highest misclassification probabilities, and
(B) repeating the procedure for subsequent respondents; and (C) following evaluation by a final respondent, selecting the m items with the lowest misclassification probabilities as those most likely to meet S.

A method according to any of the foregoing or the following, wherein the calculations of $p_i$ and $t_i$ assume a beta prior distribution, wherein the point estimate of $p_i$, $(\hat{p}_i)_{i \in \{1, \ldots, I\}}$ is defined according to equation II as follows:

$$\hat{p}_i = \frac{n_{Si} + n_{S0}}{n_{Fi} + n_{Si} + n_{S0} + n_{F0}}$$

wherein, $n_{Si}$ is the number of respondent evaluations that i meets S;

$n_{Fi}$ is the number of respondent evaluations that i fails to meet S;

and $n_{S0}$ and $n_{F0}$ are the parameters of the beta distributed prior on $p_i$.

6. A method according to any of the forgoing or the following paragraphs, wherein m is a set number of items and the threshold is adjusted dynamically to hold m constant.

7. A method according to any of the foregoing or the following paragraphs, wherein m is a set fraction of the items in I and the threshold is adjusted to maintain m constant.

8. A method according to any of the foregoing or the following paragraphs, wherein the respondents rank the items as S or Not S.

9. A method according to any of the foregoing or the following paragraphs, wherein each respondent is presented with eight to twelve items to rank.

10. A method according to any of the foregoing or the following paragraphs, wherein the total number of respondents is between 15 and 500.

11. A method according to any of the foregoing or the following paragraphs, wherein the total number of evaluations is between 100 and 10,000.

12. A method according to any of the foregoing or the following paragraphs, wherein the number of items in I is constant.

13. A method according to any of the foregoing or the following paragraphs, wherein the number of items in I is not constant.

14. A method according to any of the foregoing or the following paragraphs, wherein additional items are added to I after evaluations by a first respondent and before evaluations by a last respondent.

15. A method according to any of the foregoing or the following paragraphs, wherein respondents are presented with items via the internet.

16. A method according to any of the foregoing or the following paragraphs, wherein the items relate to products or services.

17. A method according to any of the foregoing or the following paragraphs, wherein the items are ideas for a new product or a new service.

18. A method according to any of the foregoing or the following paragraphs, wherein the items are ideas for improving an existing product or an existing service.

19. A method according to any of the foregoing or the following paragraphs, wherein the method is utilized in an on-line survey, the respondents are consumers and the items are ideas about a product or service.

20. A system for carrying out a method according to any of the foregoing or the following paragraphs, especially the foregoing.

21. An executable program in any readable medium for carrying out the computational aspects of any method in accordance with any of the foregoing or following paragraphs.

22. Any of the foregoing or the following paragraphs, wherein the variables are calculated in accordance with other specific prior and/or posterior distributions.

BRIEF DESCRIPTIONS OF THE FIGURES

NOTATIONS AND DEFINITIONS

Figure 1:
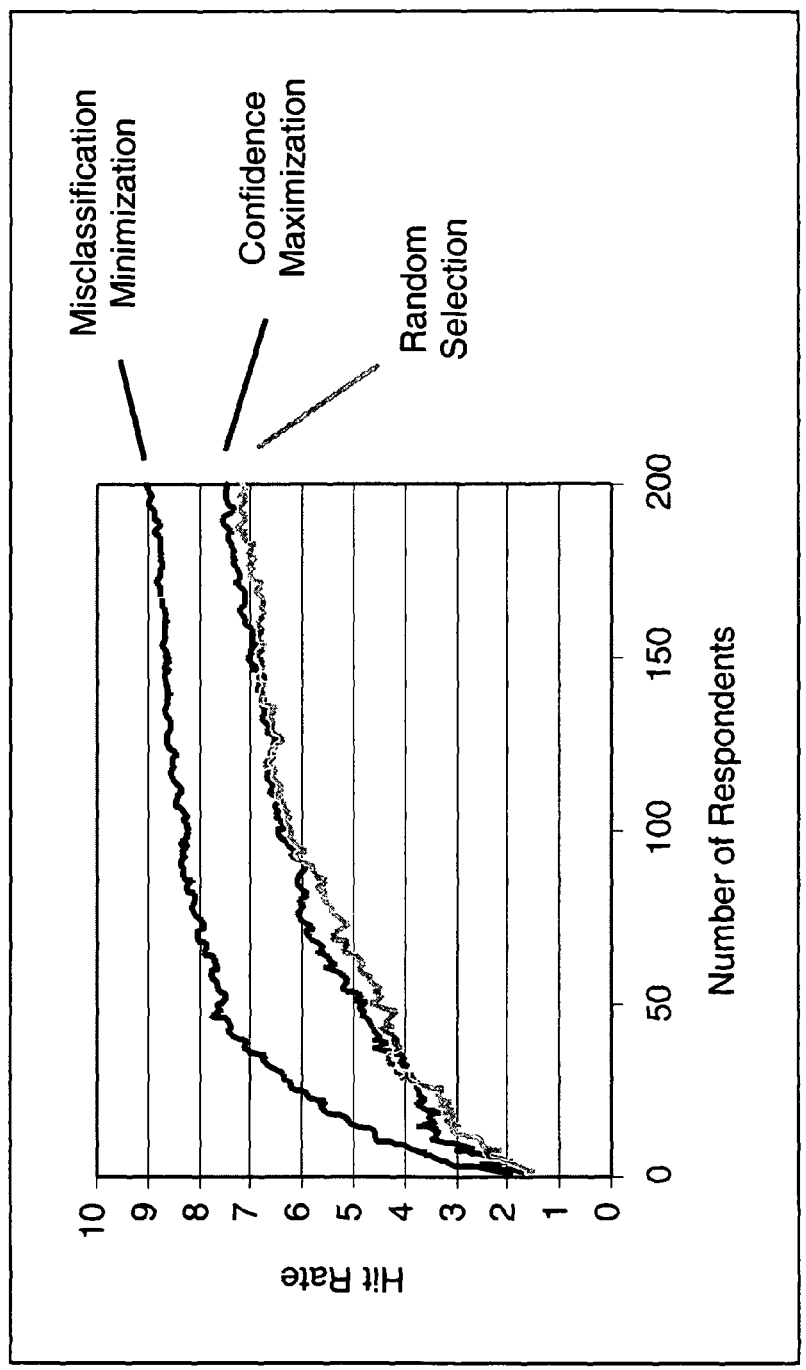
FIG. 1 is a graph showing hit rate as a function of the number of respondents for Misclassification Minimization and two benchmark heuristics: Random Selection and Confidence Maximization. The simulation was carried out as described in Example 1.

The following short summary is provided solely as a brief contextual aid to understanding the notations and definitions below. A full understanding can be had only by reading and understanding the application in its entirety as it should be understood by those skilled in the arts to which it pertains.

Described herein are, among other things, algorithms that are useful for classifying items, among other uses. The algorithms are useful for classifying items, particularly to identify in a set of I items, a subset of m items that are the most likely to meet one or more specific criteria. The algorithms can be used, for instance, to identify in a set containing I items a subset of the m "top" items, or the m items that meet or exceed a threshold value.

The algorithms have many useful applications in a wide variety of fields. Such applications conveniently may be exemplified by their use in certain types of consumer surveys, particularly surveys to identify the "top" items for product development. For this purpose, as a general rule, each member of a set of consumer respondents, is asked to evaluate a subset of k items, selected from a pool of more than k items. For demonstration purposes, in particular, but also in use, it is both convenient and effective to present the respondents with a binary choice of the items presented to them, e.g., to indicate for each item whether they think it is "good" or "not good." The choice of the k items to present to each respondent, except the first, is based, in part, on the choices of previous respondents. As explained herein, heuristics of the invention achieve accurate asymptotic estimations of the sets of items that meet the predefined criteria that are faster and more accurate than random selection and other, more systematic methods.

The following notations and definitions are utilized herein in describing the invention.

$N_{resp}$ designates the total number of respondents.

I designates the total number of items.

i designates an individual item in I.

k designates the number of items presented to each respondent.

m designates the number of items i to be selected from I, for instance, if the objective is to select the ten highest ranking items (by any given measure) then m=10.

$(n_{Si})_{i \in \{1,\ldots,I\}}$ is defined as the number of respondents who have evaluated item i and classified it as a good item. (S stands for "success").

$(n_{Fi})_{i \in \{1,\ldots,I\}}$ is defined as the number of respondents who have evaluated item i and did not classify it as a good item. (F stands for "failure").

$(p_i)_{i \in \{1,\ldots,I\}}$ is defined as the probability that a randomly selected respondent will evaluate item i in a certain way, such as "good" when evaluating the item either as "good" or "not good." The value of $p_i$ serves as a quantitative measure of the mean quality of each item as evaluated by the respondents. It is useful in the invention as a selective measure, among other things. For example, the m best items in a population of items can be defined as the m items with the m highest $p_i$'s.

Notably, $p_i$ is a purely statistical measure and, in and of itself, it does not involve criteria central to judging "quality" by other approaches. For instance, as applied to the identification of the "best" items for product development, $p_i$ evaluated by a binary choice, such as good or not good, does not involve specific considerations such as cost, feasibility, fit with core competencies, or other aspects that generally are important to decision making in a business context, such as those discussed in Ozer (2005).

Such considerations can, of course, be evaluated by other selection processes, which can be used in conjunction with the methods of the present invention. Such evaluations can, of course, be carried out before or after, methods of the present invention are applied, or along with them. Such considerations also can be taken into account by making them the explicit subject of selection by respondents.

$(\hat{p}_i)_{i \in \{1,\ldots,I\}}$ is defined as the estimate of $p_i$, based on previous evaluations by respondents in a given study. It is the expected value of the distribution of a given item i.

$$\hat{p}_i = \frac{n_{Si} + n_{S0}}{n_{Fi} + n_{Si} + n_{S0} + n_{F0}}$$

wherein in addition to the above $n_{S0}$ and $n_{F0}$ are the parameters of the beta distributed prior on $p_i$ Simulations and examples herein described assume a beta distributed prior on $p_i$: Beta($n_{S0}, n_{F0}$). Given the binomial likelihood distribution of the binary evaluations provided by the respondents in the illustration and examples herein discussed, the posterior on $p_i$ also will follow a beta distribution: Beta($n_{Si}+n_{S0}, n_{Fi}+n_{F0}$). Beta priors are conjugates for binomial likelihoods, as discussed by Gelman et al. (1995). Notably, other priors can be used, as discussed in greater detail elsewhere herein.

Any number of other distributions can be used in accordance with the invention in this regard. For instance, new product launch and market penetration have been modeled in terms of Lambertian distributions. Of course, the shape of the distributions differ as a function of cost, awareness, and other factors. In general, distributions in which the probability of an event is a function of one or more previous events, such as is the case in Markov distributions, are particularly useful in this aspect of the invention and preferred embodiments thereof.

Beta($n_{Si}+1, n_{Fi}+1$) is a distribution of the responses, assuming a binomial classification of the items that is described by a beta function, and a flat prior on $\hat{p}_i$.

$t_i$ is defined as the misclassification probability of i, wherein: (a) if i is in the "top" group, $t_i=\text{Prob}(p_i \leq \bar{p})$, and (b) if i is in the "bottom" group, $t_i=\text{Prob}(p_i \geq \bar{p})$. $t_i$ is an approximation of the probability that i has been misclassified. The exact probability is a function of the probability distributions associated with the entire set of items. In practice, these may not be known and may not be determinable a priori. In other cases, more may be known about the prior and it may be possible, computationally, to calculate exact probabilities. In some such cases, while it may be possible to do so, it may not be practical, due to impractical computational requirements. However, typically, it is not necessary to know the exact a priori probabilities, which would not, in any event, substantially improve results over those obtained using an approximate prior, even if it is incorrect, as discussed further below.

DESCRIPTION OF THE INVENTION

In various aspects and preferred embodiments the present invention relates to the approximation of real probabilities of, for instance, the "fitness" (or "quality" or the like) of one or more items in a set of items, and to rapid and accurate methods of selecting items based thereon having the highest probabilities of being the most desired items in the set of items. In particular, in various preferred aspects and embodiments, the invention relates to methods, including certain types of algorithms, for parsing a set of items into a defined subset of the items with the estimated probabilities that best match a desired probability or range of probabilities of having one or more defined "qualities."

Thus, in certain of its preferred aspects and particular embodiments thereof, the invention relates to methods and algorithms and the like for selecting from a collection of items, sets of items for evaluation by a series of respondents, wherein items are selected for evaluation by each succeeding respondent based on the evaluations by the prior respondents. In particularly preferred embodiments in this regard, items are selected for evaluation in accordance with a Misclassification Probability which is, in general, calculated for each item from the number of prior evaluations and its average ranking. Items are ranked according to their Misclassification Probability and those with the most uncertainty in the evaluation are selected for further evaluation. Items that have not been evaluated and those with relatively few evaluations will have higher variances and will be selected more readily. Those that are close to the value between the high and low fitness groups also will be more readily selected. These aspects and embodiments of the invention thus provide for more rapid and more accurate identification of the "best" items in a group of items, based on evaluations by respondents (i.e., "best" being a matter of definition: those items most likely to "fit" certain criteria that are chosen as defining the "best"/"desirable" properties of the items).

"Misclassification Minimization"

Methods of the invention, in certain of its aspects and preferred embodiments thereof, provide for identification of the "best" items by "Misclassification Minimization." Methods in this regard are discussed below in general. Applications are illustrated in the examples.

Assume that a set of items (presented to a first (n−1) respondent) and the corresponding evaluations are available when selecting the items to present to the $n^{th}$ respondent. This will be the case in a variety of situations, as would be for on-line evaluations.

The problem of identifying the top m items can be viewed as that of correctly classifying items into two groups: the group containing the m items with the highest associated probabilities, and its complement (referred to as the "top" and "bottom" groups, respectively). Given the previous evaluations, one can not only classify the items, but also compute a "misclassification probability" for each item, equal to the probability that the item has been assigned to the wrong group. The heuristic specifies that successive respondents should evaluate the k items with the highest misclassification probabilities.

More precisely, the algorithm applies the following steps to determine the subset of items to be presented to the next respondent:

1. Identify the m items with the highest estimated probabilities: $i_1, \ldots, i_m$.

2. Determine $\underline{p}$, the smallest probability estimate among the current "top" items, and $\overline{p}$, the highest probability estimate among the "bottom" items.

3. For each item i, compute a "misclassification probability," $t_i$, wherein:

(a) If i is in the "top" group, $t_i = \text{Prob}(p_i \leq \overline{p})$, and (b) If i is in the "bottom" group, $t_i = \text{Prob}(p_i \geq \underline{p})$.

$T_i$ is an approximation of the probability that an item has been misclassified. The exact probability depends on the probability distributions associated with the entire set of items. It is computationally challenging to estimate the probabilities based on these set-wide distributions in real time without noticeable delays.

4. Select the k items with the highest misclassification probabilities for evaluation by the next respondent. An item will have a higher misclassification probability (and hence will be more likely to be presented for evaluation by the next respondent) if $p_i$ is closer to $\underline{p}$ (or $\overline{p}$, depending on the classification), and/or if the number of evaluations of item i is smaller (and the variance of $p_i$ therefore is higher).

The Number of Items, "k," Presented to Each Respondent for Response

The number of items presented to each respondent, k, can be varied, and choosing an optimum number reflects several trade offs. On the one hand, the higher the number of items presented to each respondent, the higher the total number of evaluations for a given number of respondents. If respondents are paid a fixed fee for their participation, there is no marginal cost to increasing k, suggesting that k should be as large as possible.

One the other hand, at least two factors might decrease the optimal value of k. The first one is driven by the cognitive limitations of the respondents. A large value of k might lead to cognitive overload and reduce the quality of the evaluations. The number of items that can be handled by an average respondent is an empirical question. Experience suggests, however, that consumers, at least, are comfortable with k=10 items.

The second factor is speed. Respondents will take more time to evaluate k items than k=n+1 or more items, where n is 1 or greater than 1, all other things being the same. Although the number of respondents necessary for a given number of total evaluations increases with decreasing k, the algorithm, generally, will work more efficiently, because the probability estimates are updated in real time based on the evaluations of each respondent as they are completed in turn. At any given time, therefore, the number of respondents who have completed their evaluations will be greater for k=n than for k=n+1 or more.

For example, whereas, when five items are presented first to one of two consecutive respondents and then to the other, the selection of the items presented to the second respondent can be informed by the first respondent's evaluations. The additional information from the selections by the first respondent will not be available if the first respondent evaluates the same ten items (unless the ten items are presented to this respondent in two groups of five items and information from the evaluations of the first five items is utilized in selecting the second items).

Figure 3:
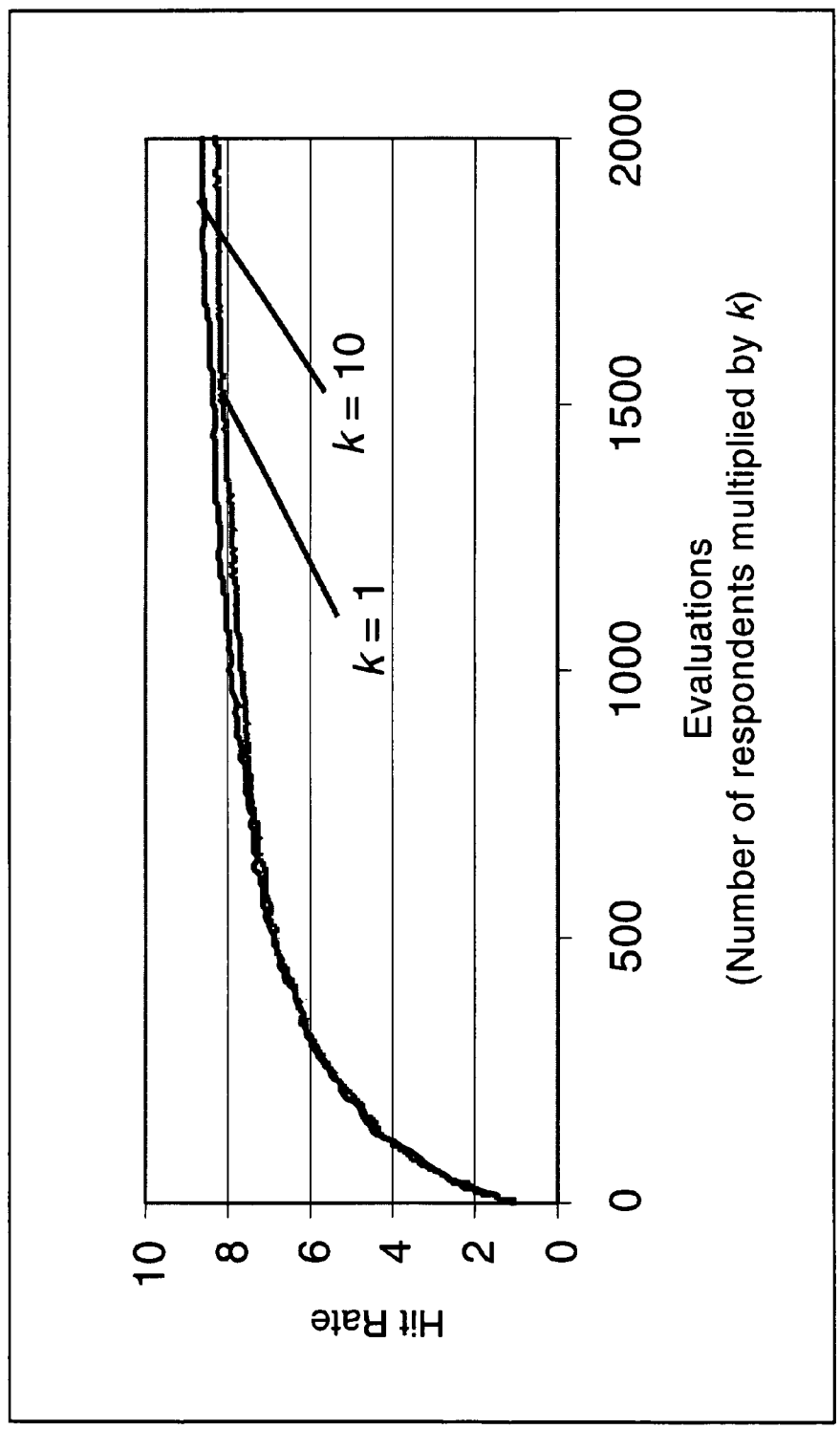
FIG. 3 is a graph showing the effect of varying k (the number of items selected for evaluation by each respondent) on the hit rate as a function of the total number of evaluations, for Misclassification Minimization with k=1 and k=10. The simulation was carried out as described in Example 3.

The effect of k on performance of the Misclassification Minimization heuristic is illustrated by the results of Example 3 for k=1 and k=10 by Example 3, depicted in FIG. 3. These simulations were carried out for both values of k with I=100, m=10 and 2,000 responses for both values of k. Keeping the total number of responses the same resulted in a difference in the number of respondents: 2,000 for k=1 and 200 for k=10. As seen in FIG. 3, results for the two values of k were the same from the beginning of the surveys up to about 700 to 800 responses, roughly at the beginning of the plateau phases of both simulations. Beyond that point, performance with k=10 begins to exceed that with k=1. The difference continues to grow, slowly, through the final total of 2,000 responses, at which point it is about 0.5 hits, and the gap is still growing.

The effect of varying k on the accuracy and speed of item selection also has been by computing the number of correct classifications for respondents presented with sets of eight, ten, or twelve items (not shown). The outcomes were virtually identical, suggesting that, in the range of k=8 to 12, increasing the number of updates in the probability estimates (i.e., reducing k and increasing the number of respondents) does not affect performance. Apparently, in this range of k, the number of hits is determined solely by the total number of evaluations, irrespective of the number of respondents or how many items each respondent evaluates.

In sum, therefore, the value of k for a given application may be optimal in the range of eight to twelve or so, with other values providing good, if somewhat lesser results. The robust performance of the heuristic over such ranges of k provides flexibility in setting this parameter and allows it to be chosen to optimize other considerations, such as cost (which can be minimized by increasing k) and effectiveness (which can be optimized by avoiding cognitive fatigue).

Selecting by Threshold

The Misclassification Minimization heuristic can also be used to select items equal to or exceeding a certain threshold value, designated $p_0$, rather than a fixed number of items, such as the m top items of the preceding section. In certain preferred embodiments in this regard, the problem is treated as one of classifying the evaluated items into one of two possible groups: (a) the group of items with $p_i > p_0$, and (b) the group of items with $p_i \leq p_0$, and then applying the Misclassification Minimization heuristic in the manner described above, in the examples, and elsewhere herein.

By way of illustrative and non-limiting example in this regard, suppose that a new product development team is interested in identifying all items above a predefined probability threshold $p_0$ (e.g., $p_0 = 80\%$). This goal can also be interpreted as a classification problem, where the two groups are the items for which $p_i > p_0$ and those for which $p_i \leq p_0$. The generalization of the algorithm thus is straightforward. For simplicity assume a uniform distribution of the proportions and uniform priors. Applying the Misclassification Minimization to this problem is the same as for selecting the top m items.

Figure 4:
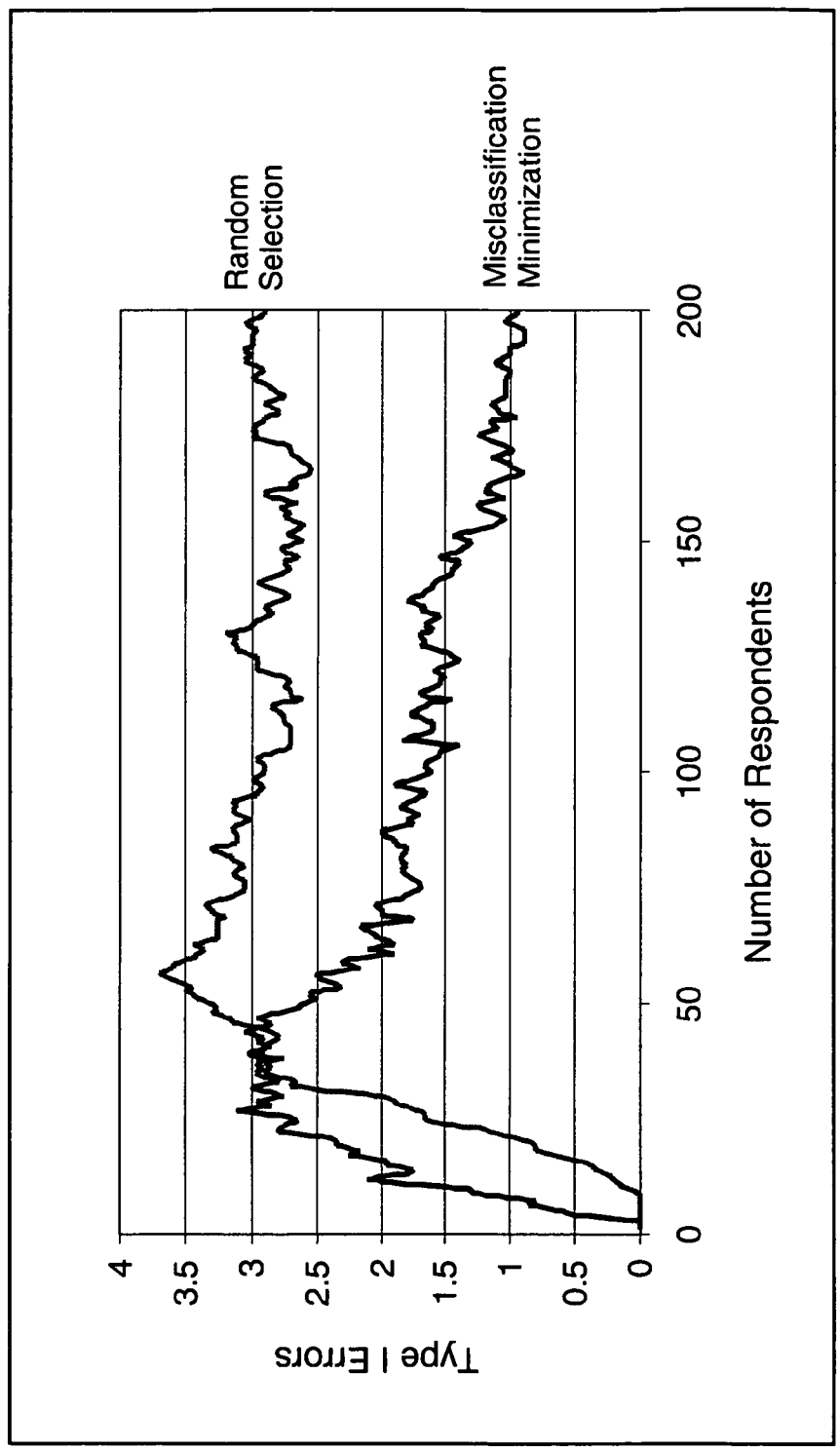
FIG. 4 is a graph showing the frequency of Type I errors as a function of the number of respondents for Misclassification Minimization and for Random Selection. The simulation was carried out as described in Example 4.
Figure 5:
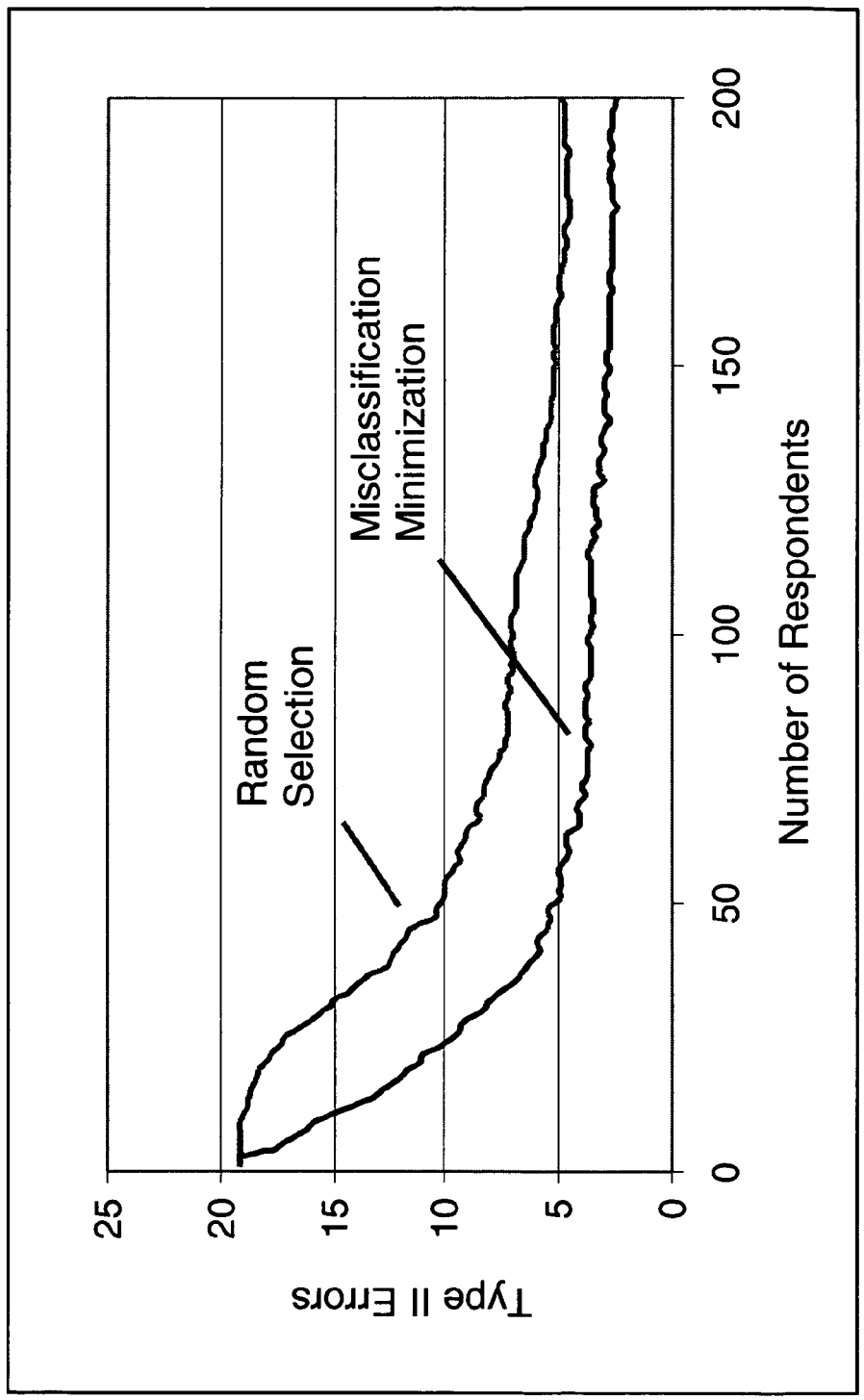
FIG. 5 is a graph showing the frequency of Type II errors as a function of the number of respondents for Misclassification Minimization and for Random Selection. The simulation was carried out as described in Example 5

Performance of the Misclassification Minimization heuristic on a classification problem of this type is compared with random selection, in terms of Type I and Type II errors, in Examples 4 and 5, and in the accompanying graphs of the results of these examples depicted in the graphs in FIGS. 4 and 5.

Non-Binary Evaluation

In the illustrations discussed above respondents choose one of two possible rankings for each item they evaluate. In the illustrations above the two rankings are "good" and "not good," but the same analysis would apply to any other such binary ranking.

Various of the preferred embodiments of certain aspects of the invention relate to using Misclassification Minimization heuristics on evaluations using non-binary rankings, as well as the binary rankings discussed above and illustrated in examples below. Implementing the Misclassification Minimization heuristic on a non-binary evaluation scale may be desired, for instance, when fine distinctions are required between respondent evaluations. Multi-level non-binary evaluation scales can be implemented readily in a Misclassification Minimization heuristic.

Fine distinctions of this type may be important in developing niche products that are being designed to appeal to a limited and relatively small population of potential buyers. The performance of the Misclassification Minimization heuristic in identifying the product items most likely to appeal to this population might be improved by using several additional evaluation categories rather than just the two discussed above.

For instance, three categories might be used: "very good," "good," and "not good," and the survey objective might be to identify the five items most likely to be "very good" items and the ten items most likely to be "good." There are a number of ways to implement a Misclassification Minimization heuristic with such a non-binary ranking scale. One way is to treat the tripartite (or other) classification as two binary classifications. By this method, estimated misclassification probabilities are calculated from responses to a first, binary choice pair, such as "very good" and "not good." Then, respondents might be asked to evaluate the j items with the highest misclassification probabilities with respect to the "very good" category and the i items with the highest misclassification probabilities with respect to the "good" category.

Alternatively, the selections might be the k items with the highest average misclassification probability across the two classifications, or with the highest maximum misclassification probability.

The Misclassification Minimization heuristic also can be implemented with non-binary rankings by weighting the choices in terms of a binary choice. For example, the three choices for the foregoing three level ranking might be weighted in terms of a binary choice by weighting each respondent classifying an item as "very good" as equal to two respondents classifying the item as "good." Fractional weightings also can be implemented, both by direct assignment of fractional weightings or by assigning all integer weightings that are the product of the desired ratings with fractional parts multiplied by a common factor that results in all integers, such as the lowest common denominator of the fractional forms. However, the calculation is carried out, the result is a "normalized" ranking system in which the weight of each rank is an integer multiple of a base, binary rank choice, which is assigned a weight of one.

The Misclassification Minimization heuristic is applied to such "normalized" results in the same way it is applied to binary choice results, with the weight times choice products treated as the resulting product number of unitary selections. That is, the choice by one respondent of a response with a normalized weight of five is treated (such as, say, "the very best") as five respondents choosing the base ranking (such as "good"). Weightings can be used in this way to increase or decrease the relative importance of given rankings to the final "mean" ranking of the items in a survey.

It is to be appreciated, moreover, that the rankings can be weighted not only on a linear scale but also on log scales, other commonly used scales, and, if so desired, unusual, exotic, or custom scales as well.

Misclassification Minimization is Effective with a Misspecified Prior, Although Performance May be Decreased The above simulations assumed a uniform prior distribution of items and a "true" uniform prior for the Misclassification Minimization algorithm. In application, the Misclassification Minimization algorithm often must be used without knowing the correct prior. One must be assumed. Conceptually, it might be thought possible for the choice of an incorrect prior to significantly degrade the accuracy and utility of the results. The following simulations show that, while performance of the Misclassification Minimization heuristic is diminished by the choice of an incorrect prior distribution, performance nonetheless remains superior to that of the benchmark. Thus, although a misspecified prior will reduce performance to a sub-optimal level, the effect, nonetheless, is not so great as to prevent advantageous uses of the heuristic.

The Misclassification Minimization heuristic will be used in many situations where the prior will be a Beta distribution; but, even if this much is known, it will not be possible in many cases to specify the parameters of the distribution. If the effect of misspecification is sufficiently large it might limit the usefulness of the heuristic. As demonstrated in the examples below, however, misspecification of the prior distribution, although it does reduce the speed and limiting accuracy of the heuristic, the reduction is relatively slight. Even with a misspecified prior, the Misclassification Minimization heuristic outperforms the random selection. Indeed, for some misspecifications, the decrease is barely observable for the top ten items ranked by estimated p, although in some such cases it is more readily apparent for a more selective set of items, such as the top five items, rather than the top 10, ranked by estimated $p_i$.

Figure 6:
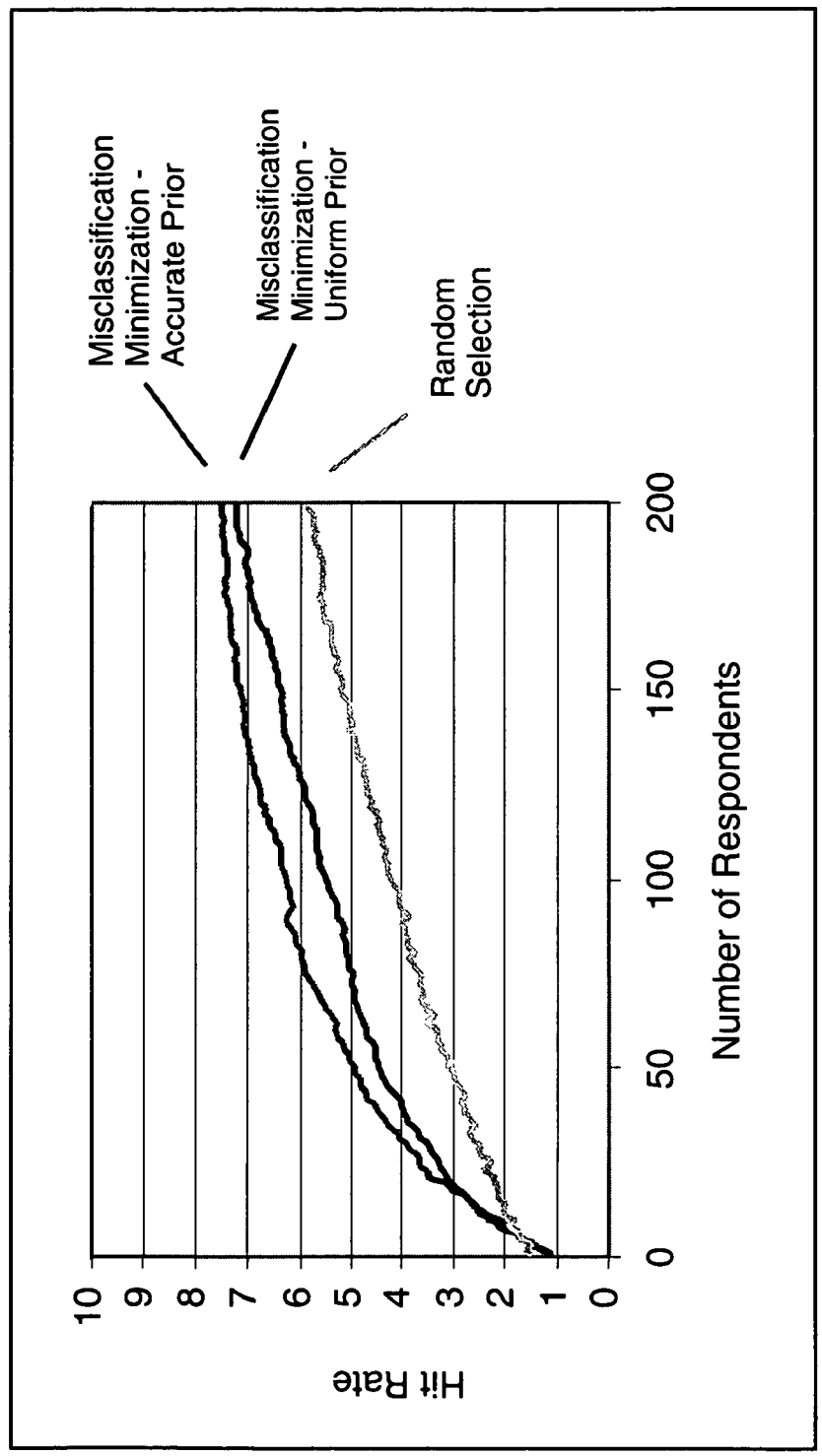
FIG. 6 is a graph showing hit rate as a function of the number of respondents for Misclassification Minimization on a Beta(3,1) prior, with the Beta(3,1) prior specified correctly and with a uniform prior misspecified incorrectly. The simulation was carried out as described in Example 6.

Example 6 illustrates the effect of misspecifying a uniform prior distribution in place of a "true" Beta(3,1) distribution for the calculation. For the true Beta (3,1) distribution in the example, the average probability is ¾, and a greater proportion of items thus have high probabilities. This distribution is characteristic of those in which most items (such as items) are of high quality. FIG. 6 provides a comparison of the results of three simulations identical to one another except that one used the Misclassification Minimization algorithm with a uniform prior ($n_{S0}=n_{F0}=1$), the second used the Misclassification Minimization algorithm with the accurate prior ($n_{S0}=3$, $n_{F0}=1$), and the third used Random Selection. The simulations were carried out otherwise with the same parameters as those described above and run 100 times with each algorithm.

FIG. 6 depicts graphically results obtained for each of the three simulations: Random Selection, Misclassification Minimization using the incorrect prior (designated "uniform" in the figure), and Misclassification Minimization using the true prior (designated "accurate" in the figure).

The results, easily seen in FIG. 6, show that Misclassification Minimization substantially outperforms Random Selection throughout the simulation, both as to rise time and eventual plateau level. Performance of the Misclassification Minimization heuristic with the misspecified prior lagged behind performance with the accurate prior, as might be expected. However, the performance with the two priors differed less from one another than they did from the far less effective performance of the Random Selection heuristic. Furthermore, the results were much the same for the two priors from the start of the survey through about twenty respondents.

After reaching a maximum separation of about one hit at approximately 125 respondents, the gap between the two performance curves began to narrow. At the end of the simulation, with a total of 200 respondents, the difference between the performance curves of the two priors had narrowed to about 0.25 or so hits, and the trend was toward equality. The example illustrates the more general proposition that the heuristic performs well even with a misspecified prior, i.e., that it is relatively robust in this regard.

Examples 7 and 8 describe simulations of much the same design in which a uniform prior was misspecified in place of a true Beta(1,3) prior. The average probability for items in the true Beta(1,3) prior distribution in these simulations is 0.25. Distributions of this type are characteristic of populations of generally low quality items.

Figure 7:
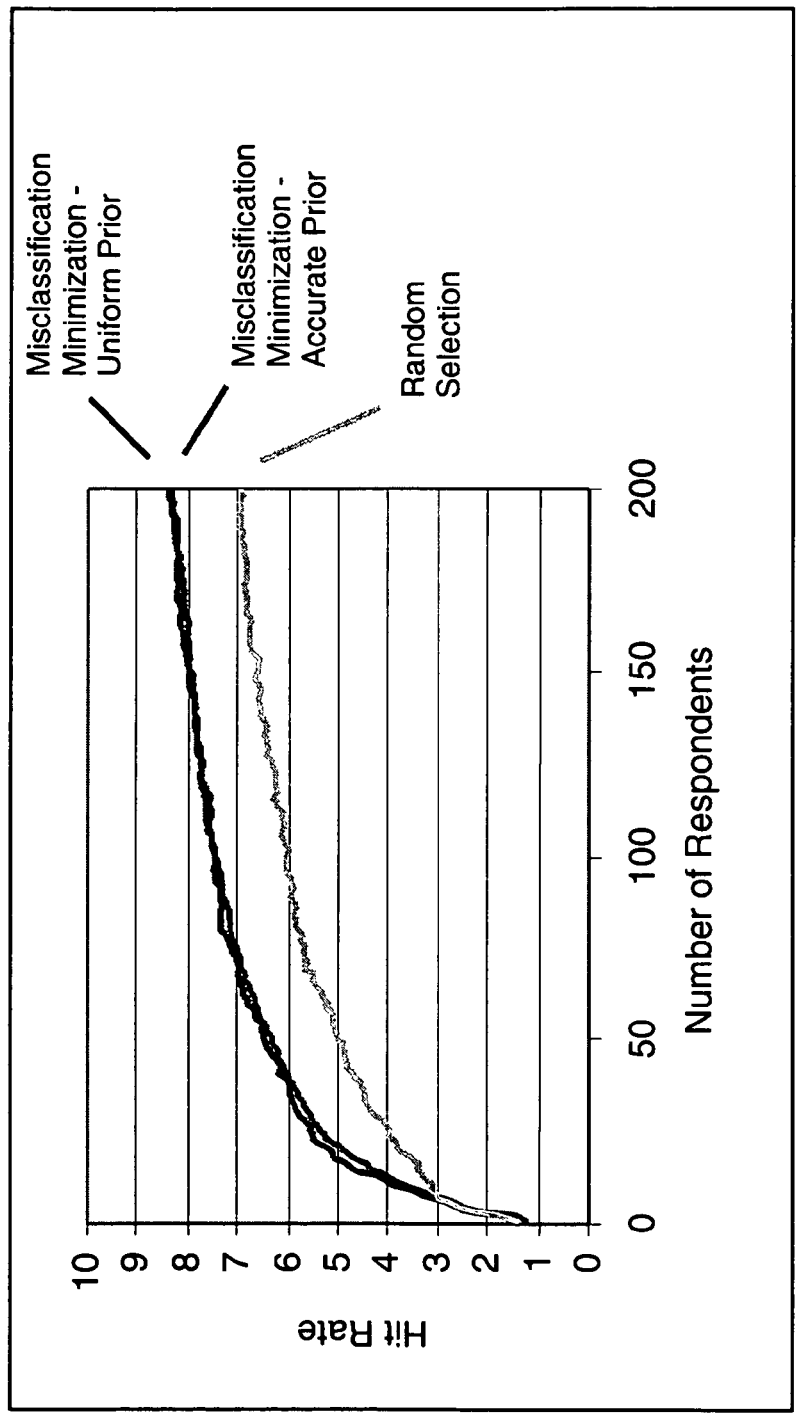
FIG. 7 is a graph showing hit rate for the top 10 items as a function of the number of respondents for Misclassification Minimization on a Beta(1,3) prior, with the Beta(1,3) prior specified correctly and with a uniform prior misspecified incorrectly. The simulation was carried out as described in Example 7.

The results of these simulations, depicted in FIG. 7 for the items with the ten highest estimated probabilities, resembled the results of Example 6. As in the simulations of Example 6, Misclassification Minimization with the correct and incorrect priors both substantially outperformed Random Selection. Also, the performance difference between the correct and incorrect priors in these simulations was much less than the performance differences between the priors and Random Selection. However, the performance of the two priors in these simulations was almost identical for the items with the top ten estimated probabilities: much closer than the corresponding performance curves obtained in Example 6.

Figure 8:
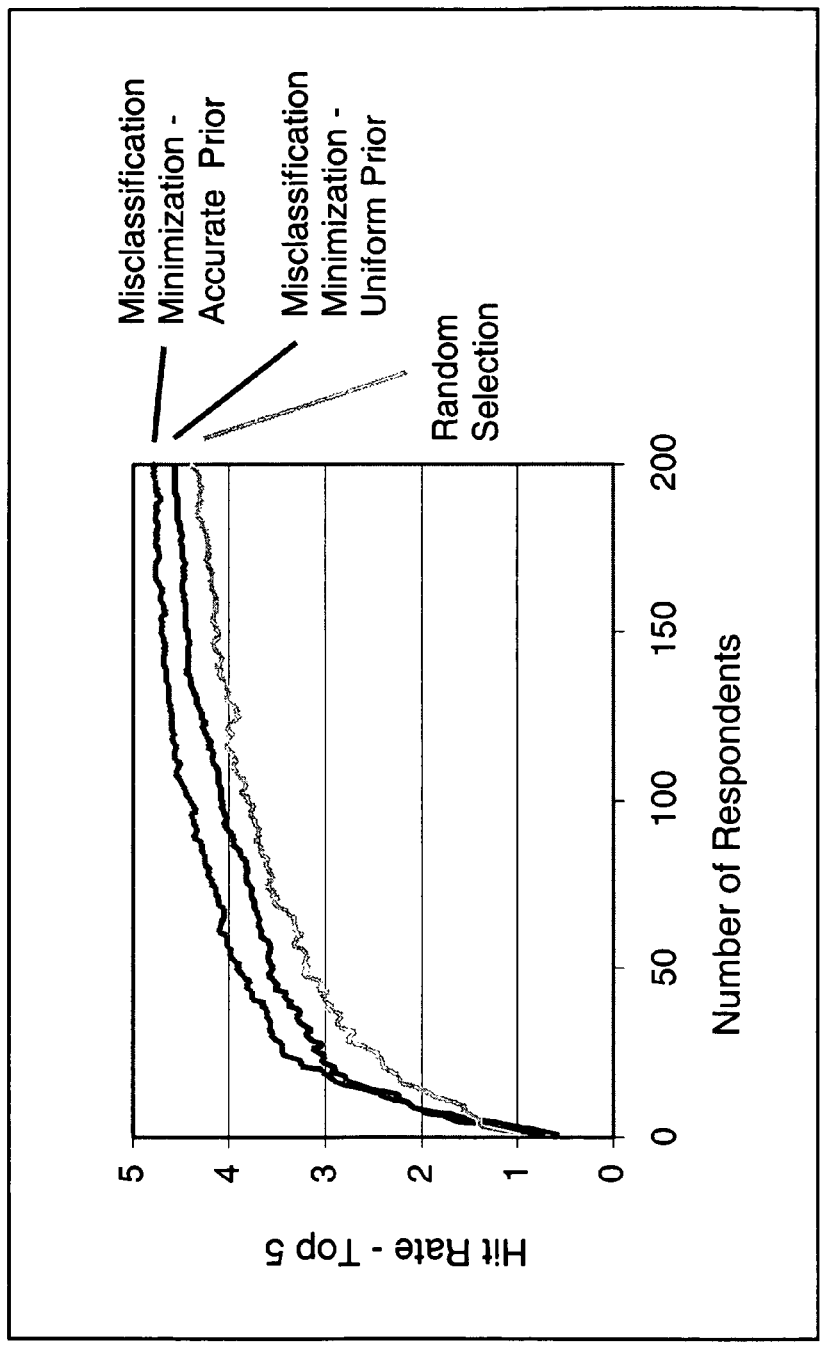
FIG. 8 is a graph showing hit rate for the top 5 items as a function of the number of respondents for Misclassification Minimization on a Beta(1,3) prior, with the Beta(1,3) prior specified correctly and with a uniform prior misspecified incorrectly. The simulation was carried out as described in Example 8.

The results of these simulations resemble those of Example 6 in this regard, when the performance of the two priors is compared only for the items with the top five probabilities, rather than the top ten. Readily seen in FIG. 8, the difference in performance of the two priors as to the top five items is closer to the difference seen in Example 6 and FIG. 6. Both the correct and incorrect prior outperform Random Selection. After an initial run of equal performance, the correct prior outperforms the incorrect prior, reaching a peak advantage with 100 respondents. The difference between the two thereafter decreases gradually through the end of the simulation, by which time it is down to around 0.25 hits.

In sum, all of the simulations show that misspecification of an unknown prior does not substantially degrade the performance of the Misclassification Minimization heuristic, and uncertainty about the true nature of the prior distribution is not, per se, an obstacle to effective implementation and application of Misclassification Minimization.

Integrated Item Generation and Evaluation

Algorithms in accordance with the invention, in accordance with the preferred embodiment of certain aspects of the invention herein described, can be implemented in systems that unify processes of item generation and item screening. In such unified processes, respondents perform two tasks in sequence. The first is to generate items on a given topic. The second is to evaluate a subset of other items (typically on the same topic) which often are those proposed by previous participants, but also may come from other sources.

A unified process of this type is useful in accordance with particularly preferred embodiments of certain aspects of the invention relating to consumer surveys, especially to the design and development of new and improved products. By way of illustration, in these aspects of the invention and preferred embodiments thereof, the respondents are recruited from a consumer panel and both contribute items and respond to previous items with which they are presented. In particularly preferred embodiments in this regard, the items relate to new product development. An illustrative example of the invention in this regard is provided in Example 9 below.

Other Applications

The invention herein described has a wide variety of applications, extending well beyond the few illustrative examples provided and discussed herein. It is applicable to evaluation processes of any type of items, by any type or grouping of respondents, not just the illustrative preferred embodiments explicitly discussed above relating to the generation and evaluation of items, particularly new product-related items by consumer respondents. While there are too many other applications to mention, by way solely of illustration, a Misclassification Minimization heuristic in accordance with the invention can be implemented with expert respondents as easily as with consumer respondents. The comparison of evaluations by Experts to those by Consumers in Example 10 is informative in this regard. Another illustration of such applications is provided by the use of heuristics of the invention to rank, for instance, job candidates, graduate school applicants, or the like using faculty members as respondents to evaluate the qualifications of the job candidate or graduate applicant. Application of the present invention to such tasks may considerably reduce the time and effort required to find the true "top" selections.

Many other aspects and embodiments of the invention will be readily understood by those skilled in the arts to which it pertains.

EXAMPLES

Solely as aids understanding the invention, the following illustrative examples are provided, by way of non-limiting exemplification only. It is explicitly intended that the examples herein merely describe particulars of the invention without being in any way limitative of the full scope of the invention in any of its generalities.

Benchmarks for Comparison

It would be most advantageous to compare the performance of Misclassification Minimization with the performance of an optimal strategy. While it is possible to identify optimal strategies by Dynamic Programming techniques, it is not practical to do so for problems of meaningful size. The dimensions of the state space are so large that identifying optimal strategies even for modest problems is a daunting challenge using standard Dynamic Programming techniques on even the best commodity workstations. For instance, see Bertsekas (1995).

Accordingly, the following two non-optimal but nonetheless useful benchmark methods were used as a reference for assessing comparative performance of the Misclassification Minimization heuristic with other methods.

One benchmark was Random Selection: each item has the same probability of being selected for evaluation by each and every respondent throughout the study. The other was a Confidence Maximization algorithm, which was a myopic approximation of the optimal strategy. This algorithm selects the items that maximize the estimated confidence that the estimated top m items are in fact the true top m items. The two benchmarks performed very similarly, hence, for ease of exposition, we only report one of the comparisons herein.

In the examples that follow, it is assumed that respondents make evaluations in sequence, and that the sets of items presented and the corresponding responses of all the preceding (n−1) respondents are available and can be utilized in selecting the set of items to be presented to the next ($n^{th}$) respondent. Thus, the challenge is that of adaptively selecting the set of items to be presented to the next respondent, based on the evaluations of the previous respondents.

The comparative performance in this task of the three selection rules is illustrated in the following examples, which clearly show the superiority of the present invention, using a Misclassification Minimization heuristic.

First Benchmark: Random Selection

The first selection rule is simply random selection. Each respondent is presented with a randomly selected set of items. Each item is equally likely to be included in the set. This selection rule serves as a benchmark for comparing other rules, since it represents, essentially, a neutral performance heuristic.

Second Benchmark: Confidence Maximization

The second rule maximizes confidence that the m items with the highest estimated probabilities $\hat{p}_i$ are in fact the m items with the highest true probabilities $p_i$, as follows.

Let $i_1 \ldots i_m$ in be the indexes of the m items with the highest estimated probabilities based on the previous evaluations. The probability that these items are in fact the top m items is:

$$Conf(\{n_{Si}\}_{i \in (1,\ldots,I)}, \{n_{Fi}\}_{i \in (1,\ldots,I)}) = \prod_{k=i1,\ldots,im} \left( \prod_{j \notin (i1,\ldots,im)} Prob(p_j \leq p_k) \right)$$

wherein $$Prob(p_j \leq p_k) = \int_{x=0}^{1} \int_{y=0}^{x} \beta_{nSj,nFj}(y) \cdot \beta_{nSk,nFk}(x) \cdot dx \cdot dy,$$

and $\beta_{nSj,nFj}$ and $\beta_{nSk,nFk}$ are respectively the probability density functions of Beta($n_{Sj}+n_{S0}, n_{Fj}+n_{F0}$) and Beta ($n_{Sk}+n_{S0}, n_{Fk}+n_{F0}$).

The above integral was computed using numerical approximations (Gelman et al., 1995), based on 100 draws. In order to obtain conservative comparisons with the Misclassification Minimization algorithm, the misclassification probabilities were also calculated using numerical integrals based on 100 draws. Similar results were obtained using the exact beta cumulative distribution function.

For each item l, we can compute the expected confidence, $Conf_l$, which would result if an additional evaluation were to be observed on that item:

$$Conf(\{n_{Si}\}_{i \in \{1,\ldots,I\}}, \{n_{Fi}\}_{i \in \{1,\ldots,I\}}) = \hat{p}_l \cdot Conf(n_{S1}, \ldots, n_{S(l-1)}, n_{Sl}+1, n_{S(l+1)}, \ldots, n_{Sl}, \{n_{Fi}\}_{i \in \{1,\ldots,I\}}) + (1-\hat{p}_l) \cdot Conf(\{n_{Si}\}_{i \in \{1,\ldots,I\}}, n_{F1}, \ldots, n_{F(l-1)}, n_{Fl}+1, n_{F(l+1)}, \ldots, n_{Fl})$$

The Confidence Maximization algorithm computes $Conf_l$ for each item l, and selects the k items with the highest confidence scores.

The algorithm has two significant limitations, i.e., two reasons why it is only an approximation of the optimal strategy: First, $Conf_l$ is computed for each item, when it should be computed for each possible set of k items. This requires the computation of $$\binom{I}{k}$$

confidence scores, a computationally intensive task beyond the practical limitations of typical information technology departments. Second, the heuristic is myopic in that it attempts to maximize the confidence that will be achieved after the next evaluation, as opposed to trying to maximize the final confidence obtained after the final respondent.

Parameters Employed Generally in the Examples

True probabilities $p_1, \ldots, p_I$ were drawn randomly from unif[0,1] for the simulations described below. $N_{resp}$ respondents were simulated using the heuristics described above. Each evaluation was drawn randomly with the corresponding probability $p_i$.

The performance metric was the number of items that are both in the true and estimated sets of top items, i.e., the number of top items correctly classified as such. The performance metric is plotted as a function of the number of respondents.

Example 1

Misclassification Minimization, Confidence Maximization, and Random Selection for I=100, m=10; k=10; and $N_{resp}$: up to 200

Performance of the Misclassification Minimization algorithm was compared with the performance of a Random Selection algorithm and Confidence Maximization algorithm in the same simulation.

True probabilities, $p_I, \ldots, p_I$, were drawn from unif[0, 1] for all of the simulations. The following parameters were used in all three heuristics: I=100, m=10; k=10; and $N_{resp}$: up to 200. A uniform prior was used in the Misclassification Minimization algorithm, so that $n_{S0}=n_{F0}=1$. The "hit rate" for all simulations was defined as the number of estimated top items identified by an heuristic that matched one of the top ten true items. Twenty simulations were run for each heuristic.

The results of the simulations are depicted graphically in FIG. 1. Results using the benchmark heuristics were congruent, or nearly so. This is typical and, in view of their congruency, the Random Selection heuristic was used by itself to benchmark the other examples set forth herein.

The FIG. 1 graph makes it easy to see that the Misclassification Minimization algorithm was more effective than the Random Selection algorithm and the Confidence Maximization algorithm, particularly in two ways. The Misclassification Minimization algorithm identified "true" hits more rapidly than the two benchmarks, evidenced by the steeper rise of its curve and its earlier plateau at about 8 hits with 50 respondents. Random Selection, in contrast, plateaued at 125 to 150 respondents with just under 6 hits.

Example 2

Comparison of Misclassification Minimization with Random Selection for I=200, m=100; k=10; and $N_{resp}$: to 300

The Misclassification Minimization algorithm is computationally efficient and can be used to analyze large data sets without demanding hardware needs. Taking advantage of this feature, performance of the two algorithms was compared by simulations on a larger problem with 200 items and up to 300 respondents. These simulations were carried out as described in Example 1, but with I=200, m=100; k=10; and $N_{resp}$: up to 300.

Figure 2:
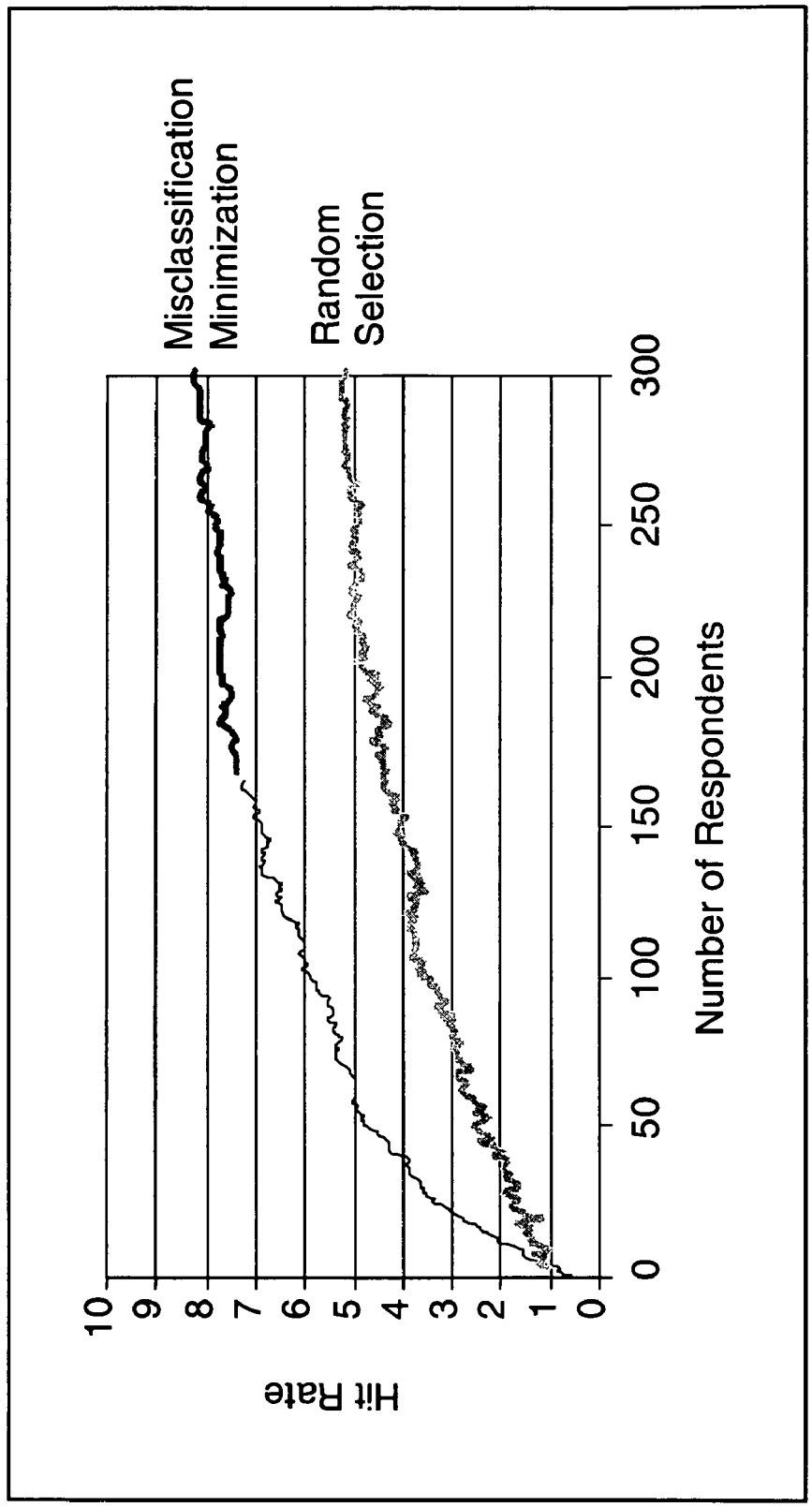
FIG. 2 is a graph showing hit rate as a function of the number of respondents for Misclassification Minimization and Random Selection for 200 items and 1 to 300 respondents. The simulation was carried out as described in Example 2.

Results are depicted graphically in FIG. 2. As seen in the graph, the advantage of the Misclassification Minimization algorithm over the random selection algorithm was even greater for the larger problem than it was for the less complex simulation discussed in Example 1. The Misclassification Minimization algorithm reaches half its maximum hit rate with fewer than 50 respondents and plateaus at a hit rate close to 8 with about 200 respondents. The Random Selection algorithm does not reach is half maximum hit rate until approximately 75 respondents, and it plateaus at its maximum hit rate of only about 5.

In these simulations the Misclassification Minimization algorithm performed substantially better than Random Selection method.

Example 3

Effects of Varying k: k=1 and k=10

The effect of k on the Misclassification Minimization heuristic is exemplified by comparing results obtained with k=1 and k=10. The other parameters, the same for both values of k, were I=100 and m=10. The same number of responses, 2,000, was obtained for each value of k. Accordingly, there were 2,000 respondents for k=1 and 200 respondents for k=10.

The results of these simulations are depicted graphically in FIG. 3. As can be seen in the graph, results for the two values of k were very similar overall and partly congruent. Over the range of these simulations the value of k from 1 to 10 does not substantially alter outcomes.

As discussed in greater detail above, a value of k might be selected for many reasons. Since the choice will not deleteriously affect the outcome, over the range and in the setting exemplified in this example, it can be on the basis of other considerations, such as the possibility of cognitive fatigue and/or the cost (or cost savings) and/or of having more or less respondents.

Example 4

Type I Errors & Example 5: Type II Errors

To assess the performance of the Misclassification Minimization heuristic in another way, the number of Type I errors (defined as the number of items classified as being above the threshold that are in fact below the threshold) by the Misclassification Minimization heuristic was compared under the same conditions with the number of Type I errors by the Random Selection heuristic.

The simulation was run using the following parameters: I=100; $p_0$=0.8; k=10 and $N_{resp}$=up to 200. True values were determined as described in Example 1. Twenty simulations were run for each condition and averaged. The averages are depicted graphically in FIG. 4.

The number of Type II errors (defined as the number of items classified as being below the threshold that are in fact above the threshold) was determined for both heuristics, using the same procedures and the same parameters. The results for Type II errors are depicted graphically in FIG. 5.

The results depicted in FIGS. 4 and 5 show clearly that the Misclassification Minimization heuristic generally outperforms the Random Selection method as to both types of errors individually, and that the total number of errors (Type I+Type II) generally is lower for the Misclassification Minimization heuristic than for Random Selection, except that the number of Type I errors is higher for the Misclassification Minimization heuristic for the first 40 respondents.

Example 6

Misspecification of the Prior: Uniform Prior for a True Beta(3,1)

The above simulations assumed a "true" uniform prior distribution of items and used the same uniform prior for probability estimations calculated by the Misclassification Minimization algorithm. However, there are many applications in which an algorithm of the present invention can be used to advantage in which the prior distribution is not known. Sensitivity to misspecification of the prior distribution, if sufficiently severe, would hinder or altogether preclude use of the Misclassification Minimization heuristic in applications where the prior is not known. Fortunately, as illustrated by the results of this example and those of Examples 7 and 8 which follow this one, performance of the Misclassification Minimization heuristic is robust on this parameter and is fairly insensitive to misspecified priors.

This example simulates the effects of misspecifying a prior with a Beta(3, 1) distribution as, instead, a uniform distribution. That is, the example simulates the results that would be obtained where the true probabilities follow a Beta(3, 1) distribution, but the estimated probabilities are calculated for a uniform distribution.

In the Beta(3, 1) distribution the average probability of items is 0.75 (which is 50% higher than in a random distribution) and the proportion of the population with high probabilities is much increased over that of a random distribution. This distribution is characteristic of populations rich in high quality items, e.g., a group of items rich in good items.

Identical simulations were run for Random Selection, the Misclassification Minimization algorithm using the incorrect, uniform prior distribution ($n_{S0}=n_{F0}=1$), and the Misclassification Minimization algorithm using the correct prior Beta (3,1) distribution ($n_{S0}=3$, $n_{F0}=1$). All simulations were carried out otherwise as described in the foregoing example. Each simulations was run 100 times. The average of the 100 runs for each of the three simulations is depicted graphically in FIG. 6.

The results, clearly visible in FIG. 6, show that whether the correct or the incorrect prior was specified, the Misclassification Minimization algorithm substantially outperformed Random Selection. At the same time, the results show clearly that the algorithm performed better when the correct prior was specified than when the incorrect prior was used. The performance difference is greatest from about 25 respondents to about 150 respondents. With less than 25 respondents, performance was relatively unaffected by misspecification of the prior. Furthermore, as the number of respondents increased beyond about 150 to 175, the difference between the performance curves for the correct and the incorrect priors gradually narrowed, progressively growing smaller up to the end of the simulations at 200 respondents. At this point the difference was only about 0.25 hits and may well have disappeared with more respondents.

The effect of misspecification of the prior as a uniform distribution can be explained as follows. The performance difference arises from the fact that if a true "top" item, such as product ideas, is shown to a very small set of respondents, such as consumers, (e.g., 3 or 4), who all dislike it, it will be discarded faster with a uniform prior than with a Beta(3,1) prior. Consequently, the posterior distribution on this item (such as an idea) will have a low mean probability with a relatively small variance. Thus, it will be classified as a "bottom" item (such as an idea) with a very small misclassification probability. Consequently, it is unlikely to be shown to additional respondents (such as consumers), and, therefore, likely will remain incorrectly rated.

When the correct prior is specified, the posterior not only will have a larger mean but it also will have a larger variance than was the case for the incorrectly specified uniform prior. As a result the item (such as an idea) subject to early misranking by a very few subjects still will have a relatively low misclassification probability and, as a result, it is likely to be evaluated by additional respondents. The few initial evaluations, which were erroneous, thus are likely to be counterbalanced by the evaluations of additional respondents.

In concrete terms, for example, in the absence of other responses, three successive negative evaluations lead to a mean of 0.20 and a variance of 0.026 under a uniform prior, and the item is unlikely to be evaluated by many other respondents. The same evaluations lead, under the correct prior, to a mean of 0.43 and a variance of 0.031, and the item thus is much more likely to be further evaluated by a sufficient number of respondents to balance the skewed mean of the initial evaluations.

Notwithstanding the foregoing, which indicates clearly the advantages of specifying a correct prior, the example also shows that the Misclassification Minimization heuristic performs substantially better than Random Selection even under an incorrect prior. These results also show that the detrimental influence of an incorrect prior is a function of the number of respondents (evaluations). The detriment, thus, can be minimized by adjusting the number of respondents.

Example 7

Misspecifying a Prior Beta(1,3) Distribution as Uniform for the Highest Ranking (Top) Ten Items & Example 8: Misspecifying a Prior Beta(13) Distribution as Uniform—Effect on the Highest Ranking (Top) Five Items The effects of prior misspecification are further illustrated by misspecifying a true Beta(1,3) distribution as a uniform distribution. The Beta(1,3) function describes distributions in which most of the items are of marginal value, and mirrors the Beta(3, 1) prior of the preceding example. Thus, whereas the preceding prior characterizes populations skewed to high probability items, the Beta(1,3) prior of this example is skewed to low probability items. Such distributions are typical, for instance, of ideas from and evaluated by consumer respondents, such as those illustrated by Example 9 below.

Akin to the problem of early skewing in the previous example, the effect of misspecifying a uniform prior in place of the "true" Beta(1,3) prior is manifest most clearly when the first few respondents all evaluate a low probability incorrectly as a high probability item. When this occurs with the incorrect uniform prior, the item has both a very high estimated probability and a very low misclassification probability. Consequently, it will have a very low priority for further evaluation and is unlikely to be presented to additional respondents. With the correct prior, the same item under the same circumstances will have a substantially lower estimated probability and a significantly higher misclassification probability. It will, therefore, have a considerably higher priority for further evaluation and will be much more likely to be evaluated by additional respondents. The additional evaluations, by regression to the mean, generally will balance the initial overevaluations and thereby provide an accurate estimation of the mean probability of the item. Such distributions are typical of, for instance, ideas from and evaluated by consumer respondents (such as the distribution exemplified in Example 9).

The simulations described in these two examples (Examples 7 and 8) were carried out in the same manner as those of Example 6, except that the true prior was a Beta(1,3) distribution instead of a Beta(3,1) distribution. The average probability for items in the Beta(1,3) prior distribution is 0.25 which, as mentioned above, is characteristic of populations substantially skewed to low quality items.

The results of these simulations, depicted in FIG. 7 for the items with the ten highest estimated probabilities, resembled the results of Example 6. As in the simulations of Example 6, Misclassification Minimization with the correct and with the incorrect priors both substantially outperformed Random Selection. Also, the performance difference between the correct and incorrect priors in these simulations was much less than the performance differences between the priors and Random Selection. However, the performance of the two priors in these simulations was almost identical for the items with the top ten estimated probabilities, much closer than the corresponding performance curves obtained in Example 6.

Interestingly, the results of these simulations resemble those of Example 6 in this regard, when the performance of the two priors is compared only for the items with the top five probabilities, rather than the top ten. Readily seen in FIG. 8, the difference in performance of the two priors as to the top five items is closer to the difference seen in Example 6 and FIG. 6. Both the correct and incorrect prior outperform Random Selection. After an initial run of equal performance, the correct prior outperforms the incorrect prior, reaching a peak advantage with 100 respondents. The difference between the two thereafter decreases gradually through the end of the simulation, by which time it is down to around 0.25 hits.

In sum, all of the simulations described in these examples and in the previous example demonstrate that misspecification of an unknown prior does not so substantially degrade the performance of the Misclassification Minimization heuristic that its use becomes disadvantageous. To the contrary, even with a misspecified prior, the heuristic outperforms Random Selection, and performance with the misspecified prior approaches that of the correct prior as the number of respondents increases. Thus, lack of knowledge of the true prior distribution of a population is not per se an obstacle to effective and advantageous use of Misclassification Minimization.

Example 9

Consumer Survey

The application of Misclassification Minimization to consumer surveys is illustrated by the following model surveys of ideas relating to new product development. The results, as described below, show that performance of the heuristic was accurately modeled by the simulations described above, and that the Misclassification Minimization heuristic substantially outperforms Random Selection. This is the case most greatly with an informative prior, but performance also improves quite substantially even when an incorrect prior is specified.

Survey Design

The surveys described in this example were designed to determine the best ideas on consumer hair coloring products, based on evaluations by panels of consumer respondents. The respondents evaluated ideas selected from pools of ideas which had been gathered from other respondents. As described below, respondents evaluated ideas with respect to three specific questions. Furthermore, the survey was carried out using three different algorithms for selecting ideas. The overall design provided three well-defined empirical measures for comparing the performance of the three algorithms.

Each respondent in the survey evaluated ideas associated with the three questions set out below. The number of ideas in the pools for each of the questions also is noted below.

Question (1) "When looking for information about hair coloring products in a store, you may only find the information that is available on the packages. What type of other information and services do you think should be available on the package or on display at the store to make your purchase and shopping experience better?" There were 96 ideas in the pool of ideas for question one.

Question (2) "Think about the packages and in store displays that are currently available for hair color products. How would you improve them in order to make it easier to shop for the right color?" There were 60 ideas in the pool of ideas for question two.

Question (3) "What, if anything, do you dislike when purchasing hair color products in a store, and what suggestions would you give for improvements?" There were 55 ideas in the pool of ideas for question three.

Throughout the survey each respondent was presented with each of the three questions and, along with each question, a subset of ten ideas drawn from the corresponding pool of ideas.

The respondents were divided into three groups. A different method was used for each group for selecting the ideas to be evaluated by successive respondents. Except for the difference in the algorithms, the surveys were identical for the three groups.

To compare performance of the three algorithms on all three questions, a between subjects design was implemented. Accordingly, three groups of respondents were formed by randomly assigning respondents from the original pool, and surveys were carried out for each group using only one of the three algorithms, enumerated below.

Algorithm (1): Random selection of the ideas.

Algorithm (2): Misclassification Minimization with a uniform prior ($n_{SO}=n_{FO}=1$).

Algorithm (3): Misclassification Minimization with an informative prior ($n_{SO}=1$, $n_{FO}=3$).

Using the three questions and three algorithms resulted in a 3×3 design. This was expanded to 4×3 by the inclusion of intermediate data from the survey using Algorithm (3). The number of respondents in each "cell" of the design is presented in Table 1.

All of the respondents were recruited to the survey from a pool of on-line candidates by email invitation. Only women who use hair coloring products were selected to participate in the survey. A total of 475 such women were recruited into three groups for the survey, one group for each algorithm. The number of respondents for each algorithm is set out separately for each question in Table 1.

Table 1 also shows intermediate results for Algorithm (3), labeled "3 a." The results from 3a are derived from intermediate data for Algorithm (3), accumulated up to a time before the survey was completed. Accordingly, all of the respondents counted in 3a also are in the totals for Algorithm (3).

The number of respondents varied slightly between algorithms. In addition, respondents dropped out before completing the survey. The sample sizes for Algorithm (1) and Algorithm (2) were similar. The sample for Algorithm 3 was larger.

If the individual respondent evaluations had been available, these inequalities might have been eliminated. However, respondent evaluations were aggregated immediately throughout the surveys and were not recorded individually.

Although the individual evaluations were not available, an intermediate result that was recorded part way through the survey for Algorithm (3) provided the basis for additional analysis in this regard. This information is designated "3a" in this discussion and in the accompanying tables. Notably, since the number of respondents for 3a is less than the number of respondents for Algorithms (1) and (2), while the number of respondents for Algorithm (3) exceeds the other two, together 3a and 3 provide for, respectively, both a somewhat favorable and a somewhat conservative basis for comparing the performance of Algorithm (3) with that of the other algorithms.

TABLE 1

Numbers of Respondents

| Group (#) and Algorithm | Question and Idea Set | | |
|---|---|---|---|
| | First | Second | Third |
| (1) Random Selection | 135 | 113 | 108 |
| (2) Misclassification Minimization - Uniform Prior | 140 | 124 | 106 |
| (3) Misclassification Minimization - Informative Prior | 200 | 172 | 156 |
| (3a) Misclassification Minimization - Informative Prior - Truncated Data | 122 | 102 | 94 |

Specification of the Prior Distribution

As in any empirical survey, the "true" probabilities are unknown, a priori. Consequently, they must be estimated without benefit of extensive empirical information. Toward this end, a "bootstrapping" procedure was used for this study, as discussed in Van der Vaart (1998). The procedure involved the following three steps.

1. For each item i, draw a "true" probability from Beta($n_{Si}$+1, $n_{Fi}$+1), where $n_{Si}$ (respectively $n_{Fi}$) is the total number across conditions of positive (respectively negative) consumer evaluations.

2. Compare the obtained "true" probabilities to the estimated probabilities.

3. Repeat the above procedure 1,000 times.

To establish the prior based on empirical information, the survey was performed in a manner that provided as quickly as possible information for characterizing the prior. Accordingly, the survey was set up so that the respondents evaluated ideas in the following order. First, ideas chosen by the Random Selection Algorithm (1) were evaluated, for each of the three questions. Second, ideas selected by the Misclassification Minimization algorithm using the uniform prior (Algorithm (2)) were evaluated, for each of the three questions. Finally, ideas chosen by the Misclassification Minimization (Algorithm (3)) using the informative prior were evaluated, for each of the three questions.

The evaluations of the ideas chosen by Random Selection were used to generate a prior for use in calculating the misclassification probabilities for the ideas evaluated after selection by the Misclassification Minimization algorithm using an informative prior. That is, the evaluations of the ideas in sets chosen by Random Selection were used to determine the correct prior for calculating the misclassification probabilities using Algorithm (3).

While data from the second set of evaluations might have been used towards this end as well, in theory, the particular circumstances that obtained in this survey presented, for this set of evaluations, a possibility of endogeneity by adaptive selection that would have skewed the results, and any conclusions that might be drawn from them. See Hauser and Toubia (2005). These data therefore were not used to estimate the informative prior.

This process conferred an advantage to the evaluations using Algorithm (3) that was not enjoyed by the other algorithms. To ensure that this did not bias the results, the following calculations were performed. First, for each set of ideas, data from the other two sets of ideas was optimally fit to a Beta distribution, consistent with what would be the case when prior data is available from evaluations made by other consumers on other sets of ideas. Second, the parameter values were rounded to the nearest integers for each of the beta distributions best fit by the evaluations determined in the preceding step.

Figure 9:
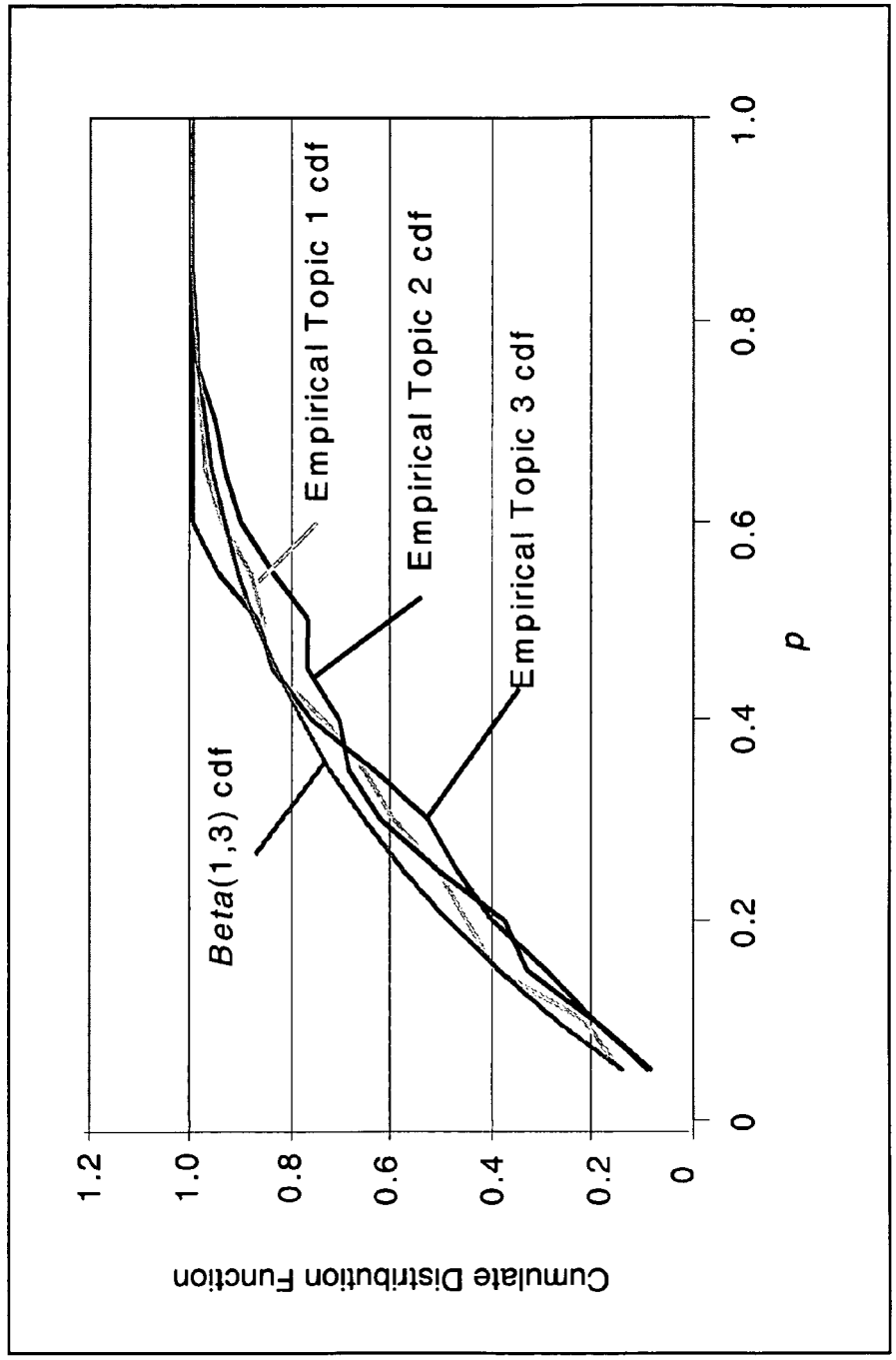
FIG. 9 is a graph showing the cumulative distribution functions for three sets of empirical data and for the "true" Beta (1,3) distribution as a function of p. The data is from the survey described in Example 9.

Applying this procedure in the present survey, it was found that the evaluations of the respondents in each of the three groups optimally fit the same Beta(1,3) distribution. That is, defining the empirical distributions by the observed proportions of consumers who positively evaluated each idea and determining the Beta distribution optimally fitting the empirical distributions, defines the prior distribution that best fits the empirical data for all three groups. As shown in the graph in FIG. 9, the distribution thus determined was a good fit for all three of the empirical distributions. In particular it was a particularly good fit for the first group of ideas.

Results of the survey in this example matched the results of the simulations. As set forth in Tables 2 and 3, the Misclassification Minimization algorithms outperformed the random selection benchmark with both the informative prior and the incorrect prior. Moreover, the hit rate achieved by the estimated top five ideas was always higher with the informative prior (even when the sample sizes were slightly lower), and the hit rate achieved by the estimated top ten ideas was higher only when the sample sizes were slightly higher.

Tables 2 and 3 show the mean performance of each of the three sets of ideas. Since the sets were presented in the same order to all respondents (i.e., the order was not randomized) there was a possibility that the respondents' evaluation of the prior sets affected their evaluations of subsequent sets, in a systematic way. This does not seem to have occurred however, inasmuch as the same results are obtained if the comparisons are done only on the first set of ideas as are obtained for all three sets.

TABLE 2

(1), (2), and (3)

| | Hit Rate of Estimated Top 10 | Hit Rate of Estimated Top 5 |
|---|---|---|
| (1) Random | 5.38 | 3.45 |
| (1) Misclassification Minimization Uniform prior | 6.33 | 3.51 |
| (3) Misclassification Minimization Informative prior | 6.75 | 4.12 |

All differences are significant at the $p < 0.01$ level.

TABLE 3

(1), (2), and (3a)

| | Hit Rate of Estimated Top 10 | Hit Rate of Estimated Top 5 |
|---|---|---|
| (1) Random | 5.12 | 3.39 |
| (2) Misclassification Minimization Uniform prior | 6.43 | 3.76 |
| (3a) Misclassification Minimization Informative prior - Truncated Data | 6.28 | 4.10 |

All differences are significant at the $p < 0.01$ level.

In sum, the empirical results demonstrate at every level that the performance of the Misclassification Minimization algorithm is substantially superior to that of the Random Selection algorithm. The results furthermore show that the performance decrement engendered by misspecifying the prior was accurately simulated in the foregoing examples and that does not impede the use of the invention in this regard, even if the prior is completely unknown.

Example 10

Expert Evaluations Compared with Consumers

The survey described in the foregoing example, in additional to being conducted with the consumer respondents discussed above, also was conducted—in the same way— with expert respondents rather than consumers. The results provide an informative comparison of the two groups and reveal some salient similarities and differences in their evaluations of the ideas. A number of conclusions on both the similarities and differences are summarized in Table 4 and in the following discussion.

Evaluation by Experts

All ideas were rated by seven expert consultants who were blind to the hypotheses. The experts were not involved in the survey. They had no knowledge about it. And they were located physically apart from those who were involved in it. Each of the experts had had experience with cosmetic products. Each expert rated each idea on a 9-point scale.

Comparison of Expert and Consumer Evaluations of the Product Ideas

For comparing the expert and consumer respondents, evaluations were normalized to range between 0 and 1, and the normalized values then were interpolated to values on a discrete 3-point scale.

The inter-respondent reliability for the expert group was relatively high—0.82, well above 0.7 the value typically used as a benchmark in market research surveys. See Rust and Cooil (1994) and Bouilding et al. (1993).

The evaluations by consumers also showed high reliability, with an average overlap of the top ten ideas across the three conditions of 5.11 (the average is taken over all three possible pairs of conditions).

Even though each groups was consistent in its own evaluations, the evaluations of the two groups differ greatly from one another. For instance, the average overlap between the top ten ideas identified by the experts and those identified by the three consumer conditions was only 2.89 ideas.

TABLE 4

Differences Between Consumer and Expert Evaluations

| Highly Selected by Consumers But Not by Experts | Highly Selected by Experts But Not by Consumers |
|---|---|
| Indicate how effective the product is for gray hair. | Provide a demonstration CD showing how to color hair. |
| Show pictures indicating how the product will interact with natural hair color. | Provide a computer simulation of how the consumer would look like after using the product (based on a digital picture of the consumer). |

The differences between the evaluation by expert and consumer respondents may be understood within von Hippel's framework of "sticky information" (Von Hippel 1994, 1998). Von Hippel argues that two types of information are necessary to develop a successful new product: "solution information" and "needs information." "Solution information" is typically owned by the manufacturer and "needs information" by the user of the product. Any idea that proposes a solution to a need can be viewed as a combination of these two types of information. However there is some variation in the extent to which the value of the idea is driven by the quality of its "needs information" versus the quality of its "solution information".

The results of the survey described in these examples suggests that experts' evaluation are more sensitive and responsive to "solution information", while consumers are more sensitive and responsive to "needs information." In other words, experts tend to appreciate sophisticated and interesting solutions, which may or may not address real consumer needs. On the other hand, consumers appreciate (sometimes simple) solutions to strong needs. Table 4 provides a few examples of ideas popular among consumers but not among experts, and ideas popular among experts but not among consumers.

REFERENCES

Each of the following is herein incorporated by reference in its entirety in parts pertinent to the subject matter described herein above in connection with the citation(s) thereof.

Bertsekas, Dimitri (1995), *Dynamic Programming and Optimal Control*, Athena Scientific, Belmont, Mass.

Boulding, William, Richard Staelin, Valarie Zeithaml, and Ajay Kalra (1993), "A Dynamic Process Model of Service Quality: From Expectations to Behavioral Intentions," *Journal of Marketing Research*, 30 (February), 7-27.

Dahan, Ely, and John R. Hauser (2001a), "Product Development—Managing a Dispersed Process," in the *Handbook of Marketing*, Barton Weitz and Robin Wensley, Editors.

Dahan, Ely, and John R. Hauser (2001b), "The Virtual Customer," *Journal of Product Innovation Management*, 19, 5, (September), 332-354.

De Bono, Edward (1970), *Lateral thinking: a textbook of creativity*, Ward Lock Educational, London.

De Bono, Edward (1985), *Six Thinking Hats, Boston*: Little, Brown.

Dennis, Alan R., and Joseph S. Valacich (1993), "Computer Brainstorms: More Heads Are Better Than One," *Journal of Applied Psychology, vol.* 78, No. 4, 531-537.

Flores, Laurent P., Howard Moskowitz (2003), "From weak signals to successful product development: using advanced research technology for consumer driven innovation," *Proceedings of the Esomar Technovate Conference*, January.

Gallupe, Brent R., Lana M. Bastianutti, and William H. Cooper (1991), "Unblocking Brainstorms," *Journal of Applied Psychology*, vol. 76, No. 1, 137-142.

Gallupe, Brent R., Alan R. Dennis, William H. Cooper, Joseph S. Valacich, Lana M. Bastianutti, and Jay F. Nunamaker (1992), "Electronic Brainstorming and Group Size," *Academy of Management Journal*, vol. 35, No. 2, 350-369.

Gelma, Andrew B., John S. Carlin, Hal S. Stern, and Donald B. Rubin (1995), *Bayesian Data Analysis*, Chapman & Hall/CRC.

Goldenberg, Jacob, David Mazursky, and Sorin Solomon (1999a), "Toward identifying the inventive templates of new products: A channeled ideation approach, *Journal of Marketing Research*, 36 (May) 200-210.

Goldenberg, Jacob, David Mazursky and Sorin Solomon (1999b), "Creativity Templates: Towards Identifying the Fundamental Schemes of Quality Advertisements," *Marketing Science, Vol.* 18, No. 3 p. 333-51.

Goldenberg, Jacob and David Mazursky (2002), *Creativity in Product Innovation*, Cambridge University Press.

Hauser, John R., Gerald Tellis, and Abbie Griffin (2005), "Research on Innovation: A Review and Agenda for Marketing Science," forthcoming, *Marketing Science.*

Hauser, John R., and Olivier Toubia (2005), "The Impact of Endogeneity and Utility Balance in Conjoint Analysis," *Marketing Science*, vol. 24. No. 3.

Nunamaker, Jay F., Jr., Lynda M. Applegate, and Benn R. Konsynski (1987), "Facilitating group creativity: Experience with a group decision support system," *Journal of Management Information Systems*, Vol. 3 No. 4 (Spring).

Ozer, Muammer (2005), "What Do We Know About New Product Idea Selection," working paper, Center for Innovation in Management Studies.

Prince, George M. (1970), *The Practice of Creativity: a manual for dynamic group problem solving*, New York, Harper & Row.

Rust, Roland, and Bruce Cooil (1994), "Reliability Measures for Qualitative Data: Theory and Implications," *Journal of Marketing Research*, vol. XXXI (February 1994), 1-14.

Urban, Glen L., and John R. Hauser (1993), *Design and Marketing of New Products*, Prentice Hall: Upper Saddle River, N.J.

Valacich, Joseph S., Alan R. Dennis, and Terry Connolly (1994), "Idea Generation in Computer-Based Groups: A New Ending to an Old Story," *Organizational Behavior and Human Decision Processes*, 57, 448-467.

Van der Vaart (1998), *Asymptotic Statistics*, Cambridge University Press: Cambridge, England.

Von Hippel, Eric (1994), "'Sticky Information'" and the Locus of Problem Solving: Implications for Innovation," *Management Science*, vol. 40, no. 4 (April).

Von Hippel, Eric (1998), "Economics of Product Development by Users: The Impact of "Sticky" Local Information," *Management Science*, vol. 44, no. 5 (May).

What is claimed is:

1. A computer implemented method for selecting a sub-population of items with the highest probabilities of meeting a criterion based on evaluations of items by respondents, comprising:
  (A) providing a population of I items i,
  (B) presenting to each of a plurality of respondents one or more items, i, of said population for evaluation,
  (C) receiving from said plurality of respondents said evaluations,
  (D) based on said evaluations selecting a sub-population of items with the highest probability of meeting a criterion S,
  wherein said sub-population meeting said criterion is identified by:
    (i) for each respondent, for each i in I, calculating an estimated probability of meeting criterion S based on the evaluations of previous respondents;
    (ii) establishing a threshold estimated probability to divide the items in I into a group of m items with the highest estimated probabilities of meeting the criterion and a group of I−m items with the lowest probabilities of meeting said criterion;
    (iii) determining the lowest probability estimate, $\underline{P}$, among the m items with probabilities above the threshold, and the highest probability estimate, $\overline{p}$, among the items with probabilities below the threshold;
    (iv) computing a misclassification probability, $t_i$, wherein for items above the threshold $t_i = \text{Prob}(p_i \leq \overline{p})$, and for items below the threshold $t_i = \text{Prob}(p_i \geq \underline{p})$; and
    (v) selecting the k items with the highest misclassification probabilities for evaluation by the next respondent; and
    (vi) repeating steps (i) through (v) until said sub-population is identified, and
  wherein steps (i) through (vi) are performed by a computer.

2. A computer implemented method for selecting from a population of I items one or more items, i, most likely to meet a criterion S based on evaluations by respondents, comprising:
  (A) providing a population of I items i,
  (B) presenting to each of a plurality of respondents one or more items, i, of said population for evaluation,
  (C) receiving from said plurality of respondents said evaluations,
  (D) based on said evaluations selecting a sub-population of items with the highest probability of meeting a criterion S,
  wherein said sub-population meeting said criterion is identified by:
    (i) calculating for each item in I a probability p of meeting criterion S based on evaluations by previous respondents in accordance with equation I as follows:

$$p_i = f\{(n_{Si})_{i \in \{1, \ldots I\}} / [(n_{Si})_{i \in \{1, \ldots I\}} + (n_{Fi})_{i \in \{1, \ldots I\}}]\}$$

wherein $(n_{Si})_{i \in \{1, \ldots I\}}$ is the number of previous respondent evaluations of i as meeting S; and $(n_{Fi})_{i \in \{1, \ldots I\}}$ is the number of previous respondent evaluations of i as failing to meet S;
    (ii) selecting m items having $p_i$ above or below a threshold p of meeting S;
    (iii) determining the lowest $p_i$ ($\underline{P}$) among the m items with the highest $p_i$ and the highest $p_i$ among the I−m other items;
    (iv) calculating a misclassification probability, $t_i$, wherein
      (i) $t_i = \text{Prob}(p_i \leq \overline{p})$ for each i of m, and
      (ii) $t_i = \text{Prob}(p_1 \geq \underline{P})$ for each i of I not in m; and
    (v) selecting k items for evaluation by the n+1 respondent with the highest misclassification probabilities;
    (vi) repeating the procedure for subsequent respondents; and
    (vii) following evaluation by a final respondent, selecting the m items with the lowest misclassification probabilities as those most likely to meet S, and
  wherein steps (i) through (vii) are performed by a computer.

3. A method according to claim 2, wherein the calculations of $p_i$ and $t_i$ assume a beta prior distribution, wherein the point estimate of $p_i$, $(\hat{p}_i)_{i \in \{1, \ldots I\}}$ is defined according to equation II, as follows:

$$\hat{p}_i = \frac{n_{Si} + n_{S0}}{n_{Fi} + n_{Si} + n_{S0} + n_{F0}}$$

wherein,
  $n_{Si}$ is the number of respondent evaluations that i meets S;
  $n_{Fi}$ is the number of respondent evaluations that i fails to meet S;
  and $n_{S0}$ and $n_{F0}$ are the parameters of the beta distributed prior on $p_i$.

4. A method according to claim 3, wherein m is a set number of items and the threshold is adjusted dynamically to hold m constant.

5. A method according to claim 3, wherein m is a set fraction of the items in I and the threshold is adjusted to maintain m constant.

6. A method according to claim 3, wherein the respondents rank the items as S or Not S.

7. A method according to claim 3, wherein each respondent is presented with eight to twelve items to rank.

8. A method according to claim 3, wherein the total number of respondents is between 15 and 500.

9. A method according to claim 3, wherein the total number of evaluations is between 100 and 10,000.

10. A method according to claim 3, wherein the number of items in I is constant.

11. A method according to claim 3, wherein the number of items in I is not constant.

12. A method according to claim 3, wherein additional items are added to I after evaluations by a first respondent and before evaluations by a last respondent.

13. A method according to claim 3, wherein respondents are presented with items via the internet.

14. A method according to claim 3, wherein the items relate to products or services.

15. A method according to claim 3, wherein the items are ideas for a new product or a new service.

16. A method according to claim 3, wherein the items are ideas for improving an existing product or an existing service.

17. A method according to claim 3, wherein the method is utilized in an on-line survey, the respondents are consumers and the items are ideas about a product or service.

* * * * *